(12) United States Patent
Yonehama et al.

(10) Patent No.: US 8,128,782 B2
(45) Date of Patent: Mar. 6, 2012

(54) AMINE EPOXY RESIN CURING AGENT, GAS BARRIER EPOXY RESIN COMPOSITION COMPRISING THE CURING AGENT, COATING AGENT, AND ADHESIVE AGENT FOR LAMINATE

(75) Inventors: Shinichi Yonehama, Kanagawa (JP); Shigeyuki Hirose, Kanagawa (JP); Shinichi Ayuba, Kanagawa (JP); Eiichi Honda, Kanagawa (JP); Masayoshi Takahashi, Kanagawa (JP); Kana Kumamoto, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 186 days.

(21) Appl. No.: 12/600,114

(22) PCT Filed: May 20, 2008

(86) PCT No.: PCT/JP2008/059213
§ 371 (c)(1),
(2), (4) Date: Nov. 13, 2009

(87) PCT Pub. No.: WO2008/143247
PCT Pub. Date: Nov. 27, 2008

(65) Prior Publication Data
US 2010/0160494 A1    Jun. 24, 2010

(30) Foreign Application Priority Data

May 21, 2007 (JP) ................... 2007 134137
Sep. 12, 2007 (JP) ................... 2007 236991
Dec. 21, 2007 (JP) ................... 2007 330689

(51) Int. Cl.
*C09J 163/00* (2006.01)
*C08L 63/00* (2006.01)
*C08G 69/00* (2006.01)
*C08G 71/00* (2006.01)
*B32B 27/26* (2006.01)
*B32B 27/38* (2006.01)

(52) U.S. Cl. ........ 156/330; 525/533; 528/363; 528/365; 528/370

(58) Field of Classification Search ................... 156/330; 428/413; 525/533; 528/363, 365, 370
See application file for complete search history.

(56) References Cited

U.S. PATENT DOCUMENTS

| 4,484,994 | A | | 11/1984 | Jacobs, III et al. |
| 4,520,167 | A | | 5/1985 | Blank et al. |
| 4,528,363 | A | | 7/1985 | Tominaga |
| 4,544,725 | A | * | 10/1985 | Priola et al. ................... 526/301 |
| 4,631,320 | A | | 12/1986 | Parwkh et al. |
| 4,758,632 | A | | 7/1988 | Parwkh et al. |
| 4,897,435 | A | | 1/1990 | Jacobs, III et al. |
| 7,267,877 | B2 | * | 9/2007 | Kutsuna et al. ............... 428/414 |
| 2002/0120063 | A1 | | 8/2002 | Kutsuna et al. |
| 2005/0014908 | A1 | | 1/2005 | Kutsuna et al. |
| 2007/0049708 | A1 | | 3/2007 | Kutsuna et al. |

FOREIGN PATENT DOCUMENTS

| EP | 0149156 | 7/1985 |
| EP | 0327038 | 8/1989 |
| EP | 327039 | 8/1989 |
| JP | 59-155470 | 9/1984 |
| JP | 60-168762 | 9/1985 |
| JP | 60-248654 | 12/1985 |
| JP | 2-018411 | 1/1990 |
| JP | 5-51574 | 3/1993 |
| JP | 7-91367 | 10/1995 |
| JP | 7-91368 | 10/1995 |
| JP | 9-316422 | 9/1997 |
| JP | 9-511537 | 11/1997 |
| JP | 2000-154365 | 6/2000 |
| JP | 2002-256208 | 9/2002 |
| JP | 2003-155465 | 5/2003 |
| WO | 95/26997 | 10/1995 |
| WO | 99/60068 | 11/1999 |

OTHER PUBLICATIONS

English language Abstract of EP 0152820, corresponding to JP 60-248654.
International Search Report issued with respect to PCT/JP2008/059213, mailed Jul. 8, 2008.

* cited by examiner

*Primary Examiner* — Michael J Feely
(74) *Attorney, Agent, or Firm* — Greenblum & Bernstein, P.L.C.

(57) ABSTRACT

The present invention provides an amine based epoxy resin curing agent and an epoxy resin composition containing the curing agent. The epoxy resin composition has a high gas barrier performance, a long pot life, and utility as a coating material or an adhesive for laminates. The amine based epoxy resin curing agent is composed of a reaction product of (A), (B) and (D) or (A), (B), (C) and (D): (A) m-xylylenediamine or p-xylylenediamine; (B) a polyfunctional compound having at least one acyl group, which is capable of forming an amide group site through a reaction with a polyamine and forming an oligomer; (C) a monovalent carboxylic acid having from 1 to 8 carbon atoms and/or its derivative; and (D) a functional compound having at least one carbonate site represented by the formula (2), which is capable of forming a carbamate site represented by the formula (1) through a reaction with a polyamine:

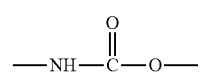

(1)

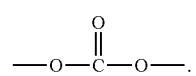

(2)

18 Claims, No Drawings

AMINE EPOXY RESIN CURING AGENT, GAS BARRIER EPOXY RESIN COMPOSITION COMPRISING THE CURING AGENT, COATING AGENT, AND ADHESIVE AGENT FOR LAMINATE

TECHNICAL FIELD

The present invention relates to an amine based epoxy resin curing agent, a gas barrier epoxy resin composition containing the same, a coating material and an adhesive for laminate.

BACKGROUND ART

Since epoxy resins have a number of excellent properties, for example, adhesiveness to various substrates, heat resistance, chemical resistance, an electrical property, a mechanical property, etc. as compared with other resins, they are utilized widely in the industrial fields including coating materials aiming at corrosion or beautiful decorativeness, adhesives for civil engineering and construction and the like. In general, though epoxy resin compositions which are used in the fields of coating materials and adhesives are good with respect to a gas barrier property as compared with urethane resins, acrylic resins, polyolefin based resins and the like, they are still inferior to polyvinylidene chloride, polyvinyl alcohol or the like which is classified into a gas barrier material. Accordingly, in the case of utilizing an epoxy resin, for the purpose of enhancing its gas barrier performance, there have been made various contrivances, for example, an increase in thickness of a coating film, covering upon being superimposed with other material, joint use with a filler, etc.

Under such circumstances, with respect to a composition for coating material using an epoxy resin, there is proposed a method for enhancing a gas barrier property against oxygen, carbon dioxide, etc. by increasing an amine nitrogen content in the composition (see Patent Documents 1 and 2). However, in view of the facts that the gas barrier property of such a composition for coating material is not remarkably high and that the barrier property under a high humidity condition is not high, more improvements are desired.

Also, there is proposed a method for more improving the battier property than those in the foregoing compositions and enhancing the barrier property under a high humidity condition by using a composition for coating material, wherein a ratio of active amine hydrogen in a polyamine to an epoxy group in a polyepoxide is at least 1.5/1; and the polyamine is a modified product of a polyamine which is an initial polyamine and in which at least 50% of carbon atoms thereof are aromatic (see Patent Document 3). However, in the foregoing composition for coating material, a large amount of an amine group having unreacted active amine hydrogen remains in the reaction product after coating; and therefore, there are involved such problems that in the case of taking into consideration coating on a metal, a concrete, etc. for the purposes of achieving rustproof and anticorrosion, excellent performances which an epoxy resin originally possesses, for example, adhesiveness, heat resistance, chemical resistance, an electrical property, etc. are not revealed; and that in the case of taking into consideration an adhesive of packaging films for the purpose of achieving gas barrier, adhesiveness and chemical resistance are poor, and performances necessary for use as the adhesive are not revealed.

As methods for solving these problems, there is proposed an epoxy resin composition composed of an epoxy resin and an amine based curing agent (see Patent Document 4).

However, though the foregoing epoxy resin composition reveals good performances in a gas barrier property, adhesiveness and chemical resistance, the curing agent to be used is one obtained by modifying a polyamine, and because of its high reactivity with the epoxy resin, the epoxy resin composition involves such drawbacks that its pot life is short and that its workability is poor.

Meanwhile, in recent years, a packaging material is being watched as an application of epoxy resin compositions. As the packaging material, complex flexible films composed of a combination of polymer materials of a different kind from each other are the mainstream for reasons of their strength, a protection property of goods, working adaptability, an effect of advertising by printing, etc. and the like. In general, such complex films are composed of a thermoplastic plastic film layer which will be an external layer playing a role for protecting goods, etc. and a thermoplastic plastic film layer which will be a sealant layer, etc. In sticking them to each other, there are adopted a dry laminating method wherein an adhesive is coated on a laminated film layer, thereby allowing it to adhere to the sealant layer; and an extrusion laminating method wherein an anchor coating agent is coated on a laminated film layer as the need arises, and a plastic film which will be a molten sealant layer is press bonded and laminated in a film form. Also, as adhesives to be used in these methods, in general, two-pack type polyurethane based adhesives composed of a main agent having an active hydrogen group such as a hydroxyl group, etc. and a curing agent having an isocyanate group are the mainstream from the standpoint of a high adhesive performance (for example, Patent Documents 5 and 6, etc.)

However, in view of the fact that in these two-pack type polyurethane based adhesives, their curing reaction is generally not so fast, in order to secure sufficient adhesiveness, it was necessary to perform curing promotion by means of aging over a long period of time of from one day to 5 days after sticking. Also, in view of the fact that a curing agent having an isocyanate group is used, in the case where the unreacted isocyanate group remains after curing, this residual isocyanate group reacts with moisture in the air to produce carbon dioxide, and therefore, there were involved problems such as generation of bubbles within the laminated film, etc.

As methods for solving these problems, there are proposed a polyurethane based adhesive and an epoxy based adhesive for laminate (for example, Patent Documents 7 and 8).

However, such a polyurethane based adhesive or epoxy based adhesive is not so high in a gas barrier property, and in the case where a packaging material is required to have a gas barrier property, the packaging material was required to be individually laminated with a gas barrier layer of every kind such as a PVDC-coated layer, a polyvinyl alcohol (PVA)-coated layer, an ethylene-vinyl alcohol copolymer (EVOH) film layer, an m-xylyleneadipamide film layer, an inorganic vapor deposited film layer having alumina ($Al_2O_3$), silica (Si), etc. vapor deposited thereon, etc. Lamination of such a gas barrier layer of every kind on the packaging material was disadvantageous from the standpoints of manufacturing costs of laminated films and working steps in lamination.

[Patent Document 1] JP-B-7-91367
[Patent Document 2] JP-B-7-91368
[Patent Document 3] JP-T-9-511537
[Patent Document 4] JP-A-2002-256208
[Patent Document 5] JP-A-5-51574
[Patent Document 6] JP-A-9-316422
[Patent Document 7] JP-A-2000-154365
[Patent Document 8] WO 99/60068

DISCLOSURE OF THE INVENTION

Problems that the Invention is to Solve

A first problem of the present invention is to provide an amine based epoxy resin curing agent comprising an epoxy resin and an amine compound capable of imparting a high gas barrier performance and a long pot life, in addition to excellent performances which an epoxy resin conventionally possesses, and an epoxy resin composition with a high gas barrier performance and a long pot life, which comprises the subject curing agent.

A second problem of the present invention is to provide an adhesive for laminate with excellent adhesiveness to various polymers, papers, metals, etc., which comprises, as a main component, an epoxy resin composition containing an amine based resin curing agent with a high gas barrier performance and a long pot life.

Means for Solving the Problems

In order to solve the foregoing problems, the present inventors made extensive and intensive investigations. As a result, it has been found that a specified amine based epoxy resin curing agent and an epoxy resin composition comprising the subject amine based epoxy resin curing agent and an epoxy resin are able to solve the foregoing problems.

That is, the present invention provides:

(1) An amine based epoxy resin curing agent comprising a reaction product of the following (A), (B) and (D) or a reaction product of the following (A), (B), (C) and (D):

(A) m-xylylenediamine or p-xylylenediamine, (B) a polyfunctional compound having at least one acyl group, which is capable of forming an amide group site through a reaction with a polyamine and forming an oligomer, (C) a monovalent carboxylic acid having from 1 to 8 carbon atoms and/or its derivative, and (D) a functional compound having at least one carbonate site represented by the formula (2), which is capable of forming a carbamate site represented by the formula (1) through a reaction with a polyamine:

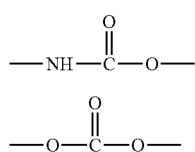

(2) A gas barrier epoxy resin composition comprising an epoxy resin and the amine based epoxy resin curing agent as set forth above in (1);

(3) A coating material comprising the gas barrier epoxy resin composition as set forth above in (2); and (4) An adhesive for laminate comprising, as a main component, an epoxy resin composition composed of an epoxy resin and an amine based epoxy resin curing agent, the subject amine based epoxy resin curing agent being the curing agent as set forth above in (1).

Advantages of the Invention

The amine based epoxy resin curing agent of the present invention has a gas barrier property and adhesiveness and contains a reaction product of a carbonate capable of lowering reactivity with an epoxy resin, and therefore, an epoxy resin composition containing the subject amine based epoxy resin curing agent has, in addition to excellent performances which an epoxy resin conventionally possesses, a good workability such as a long pot life as well as a high gas barrier property and adhesiveness at the same time. The amine based epoxy resin curing agent and the gas barrier epoxy resin composition obtained from the subject curing agent according to the present invention are suitably useful for various gas permeable substrates, for example, plastic films to be used for applications of packaging materials of foods, pharmaceutical products, etc., such as polyolefins, polyesters, polyamides, etc., or for materials to be coated, in which a conventional epoxy resin coating material is used, such as plastic containers, metals, concretes, etc.

Also, according to the present invention, it is possible to provide an adhesive for gas barrier laminate having suitable adhesiveness to various polymers, papers, metals, etc. while having a high gas barrier properties and a long pot life in addition to excellent performances of the epoxy resin.

According to the adhesive for laminate of the present invention, it is possible to provide a single layer with both a gas barrier performance and an adhesive performance because it has a high gas barrier property in addition to a suitable adhesive performance to various film materials. By making the best use of this advantage, the adhesive for laminate of the present invention is able to be suitably applied to, for example, laminated films for packaging material, etc. In the case of conventional laminated films for packaging material, it was necessary to individually use a layer having a gas barrier function and an adhesive layer to be coated for the purpose of allowing the subject layer to adhere to a sealant layer. However, by using the adhesive for laminate of the present invention, it is possible to prepare a laminated film for packaging material with a high gas barrier property without individually providing a gas barrier layer. Also, it is possible to use the adhesive for laminate of the present invention as an adhesive layer for allowing a conventional gas barrier layer such as a PVDC-coated layer, a polyvinyl alcohol (PVA)-coated layer, an ethylene-vinyl alcohol copolymer (EVOH) film layer, an m-xylyleneadipamide film layer, an inorganic vapor deposited film layer having alumina ($Al_2O_3$), silica (Si), etc. deposited thereon, to adhere to a sealant layer. In that case, the gas barrier property of the film can be remarkably enhanced. Also, in general, even in gas barrier films having such a drawback that the gas barrier performance is lowered under a high humidity condition, this drawback can be overcome through joint use of the adhesive for laminate of the present invention.

A laminated film which is prepared by using the adhesive for laminate of the present invention and a packaging bag obtained through bag-making of the subject laminated film are excellent in a gas barrier property against oxygen, water vapor, etc., a laminating strength, a heat seal strength, etc. and have a prescribed performance in a mechanical, chemical or physical strength. Such a laminated film or packaging bag is suitably useful for filling and packaging of foods such as confectioneries, staples, processed agricultural products, processed livestock products, processed marine products, fleshes, vegetables, precooked foods, e.g., frozen ready prepared foods, chilled ready prepared foods, etc., dairy products, liquid seasonings, etc.; cosmetics; medical and pharmaceutical products; and the like, sufficiently protects these contents and is excellent in their storage and preservation stability, filling and packaging adaptability, etc., while making the best use of advantages of excellent fastnesses, for example, heat resistance, waterproofing, aroma retention property, light fastness, chemical resistance, piercing resistance, etc.

BEST MODES FOR CARRYING OUT THE INVENTION

Amine Based Epoxy Resin Curing Agent

The amine based epoxy resin curing agent of the present invention comprises a reaction product of the following (A), (B) and (D) or a reaction product of the following (A), (B), (C) and (D):

(A) m-xylylenediamine or p-xylylenediamine,
(B) a polyfunctional compound having at least one acyl group, which is capable of forming an amide group site through a reaction with a polyamine and forming an oligomer,
(C) a monovalent carboxylic acid having from 1 to 8 carbon atoms and/or its derivative, and
(D) a functional compound having at least one carbonate site represented by the formula (2), which is capable of forming a carbamate site represented by the formula (1) through a reaction with a polyamine:

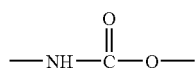
(1)

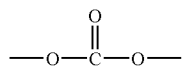
(2)

<(A)>
The foregoing (A) is m-xylylenediamine or p-xylylenediamine, and preferably m-xylylenediamine.

<(B) Polyfunctional Compound>
Examples of the foregoing polyfunctional compound (B) include carboxylic acids such as acrylic acid, methacrylic acid, maleic acid, fumaric acid, succinic acid, malic acid, tartaric acid, adipic acid, isophthalic acid, terephthalic acid, pyromellitic acid, trimellitic acid, etc.; and their derivatives, for example, esters, amides, acid anhydrides, acid chlorides, etc. In particular, compounds having a carbon-carbon double bond, which are a conjugated system with an acyl group, such as acrylic acid, methacrylic acid and their derivatives, are preferable.

<(C) Monovalent Carboxylic Acid Having from 1 to 8 Carbon Atoms and/or its Derivative>
Examples of the foregoing monovalent carboxylic acid having from 1 to 8 carbon atoms and/or its derivative (C) include monovalent carboxylic acids such as formic acid, acetic acid, propionic acid, valeric acid, lactic acid, glycolic acid, benzoic acid, etc.; and their derivatives, for example, esters, amides, acid anhydrides, acid chlorides, etc. The monovalent carboxylic acid having from 1 to 8 carbon atoms and/or its derivative (C) may be allowed to react with a polyamine upon being used jointly with the foregoing polyfunctional compound (B).

<(D) Functional Compound>
The foregoing functional compound (D) has at least one carbonate site capable of forming a carbamate site through a reaction with a polyamine. Examples of such a compound include a chain compound having a carbonate site (hereinafter also referred to as "chain carbonate compound"), a cyclic compound having a carbonate site (hereinafter also referred to as "cyclic carbonate compound") and the like. As the chain carbonate compound and the cyclic carbonate compound, compounds represented by the following general formulae (3) and (4) are preferably exemplified, respectively.

(3)

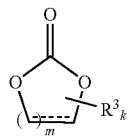
(4)

In the formula (3), each of $R^1$ and $R^2$ independently represents a hydrogen atom, an alkyl group having from 1 to 10 carbon atoms, an alkenyl group having from 2 to 10 carbon atoms, a benzyl group, a phenyl group, a pyridyl group, a benzothiazole group, a biphenyl group, a pyridylphenyl group, a cycloalkyl group having from 3 to 10 carbon atoms, a cycloalkene group having from 3 to 10 carbon atoms or a monovalent group represented by the following general formula (5). Each of the alkyl group and the alkenyl group in $R^1$ and $R^2$ may be any of linear, branched or cyclic. Each of $R^1$ and $R^2$ may have a substituent, and examples of the substituent include a halogen atom, for example, F, Cl, Br, etc., an amino group and the like. In the case where each of $R^1$ and $R^2$ has an aromatic ring or a heterocyclic ring, examples of the substituent include, in addition to those described above, an alkoxy group; a linear, branched or cyclic alkyl group, alkenyl group or alkylidine group each having from 1 to 4 carbon atoms; a functional group containing a sulfur atom or a nitrogen atom, such as a thiol group, an alkylthio group having from 1 to 10 carbon atoms, an amino group, a cyano group, an alkylamino group having from 1 to 10 carbon atoms, etc.; and the like. In the case where each of $R^1$ and $R^2$ has an aromatic ring or a heterocyclic ring, the atoms constituting the subject cyclic system may include a hetero atom such as a nitrogen atom, an oxygen atom, a sulfur atom, etc. The foregoing groups of $R^1$ and $R^2$ are merely an example, and, for example, the group having an aromatic ring or a heterocyclic ring may be any of a polycyclic ring or a condensed polycyclic ring, in addition to a monocyclic ring.

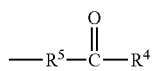
(5)

In the formula (5), $R^4$ represents a hydrogen atom, an alkyl group having from 1 to 10 carbon atoms, an alkenyl group having from 2 to 10 carbon atoms, a benzyl group, a phenyl group, a pyridyl group, a benzothiazole group, a biphenyl group, a pyridylphenyl group, a cycloalkyl group having from 3 to 10 carbon atoms, a cycloalkene group having from 3 to 10 carbon atoms, a monovalent group represented by $—OR^6$ or the like. $R^5$ represents a single bond or a divalent group such as an alkylene group having from 1 to 10 carbon atoms, an alkenylene group having from 2 to 10 carbon atoms, a phenylene group, a cycloalkenyl group having from 3 to 10 carbon atoms, a cycloalkenylene group having from 3 to 10 carbon atoms, etc. $R^6$ represents a hydrogen atom or a monovalent group such as an alkyl group having from 1 to 10 carbon atoms, an alkenyl group having from 2 to 10 carbon atoms, a benzyl group, a phenyl group, a pyridyl group, a benzothiazole group, a biphenyl group, a pyridylphenyl group, a cycloalkyl group having from 3 to 10 carbon atoms, a cycloalkene group having from 3 to 10 carbon atoms, etc. Each of the alkyl group, the alkenyl group, the alkylene group and the alkenylene group in $R^4$, $R^5$ and $R^6$ may be any of linear, branched or cyclic. Each of $R^4$, $R^5$ and $R^6$ may have a substituent, and examples of the substituent include a halogen atom, for example, F, Cl, Br, etc., an amino group and the like. In the case where each of $R^1$ and $R^2$ has an aromatic ring or a heterocyclic ring, examples of the substituent include, in addition to those described above, an alkoxy group; a linear, branched or cyclic alkyl group, alkenyl group or alkylidine group each having from 1 to 4 carbon atoms; a functional group containing a sulfur atom or a nitrogen atom, such as a thiol group, an alkylthio group having from 1 to 10 carbon atoms, an amino group, a cyano group, an alkylamino group having from 1 to 10 carbon atoms, etc.; and the like. In the case where each of $R^4$, $R^5$ and $R^6$ has an aromatic ring or a heterocyclic ring, the atoms constituting the subject cyclic system may include a hetero atom such as a nitrogen atom, an oxygen atom, a sulfur atom, etc. The foregoing groups of $R^4$, $R^5$ and $R^6$ are merely an example, and, for example, the group having an aromatic ring or a heterocyclic ring may be any of a polycyclic ring or a condensed polycyclic ring, in addition to a monocyclic ring.

In the formula (4), $R^3$ represents a halogen atom; an alkyl group having from 1 to 10 carbon atoms; an alkenyl group having from 2 to 10 carbon atoms; a benzyl group; a phenyl group; a pyridyl group; a benzothiazole group; a biphenyl group; a pyridylphenyl group; a cycloalkyl group having from 3 to 10 carbon atoms; a cycloalkene group having from 3 to 10 carbon atoms; a monovalent group represented by the following general formula (6); a divalent group such as an alkylene group having from 1 to 10 carbon atoms, an alkenylene group having from 2 to 10 carbon atoms, a phenylene group, a cycloalkenyl group having from 3 to 10 carbon atoms, a cycloalkenylene group having from 3 to 10 carbon atoms, etc.; or the like. m represents an integer of from 1 to 4; and k represents an integer of from 0 to (2×(m+1)). Each of the alkyl group, the alkenyl group, the alkylene group and the alkenylene group in $R^3$ may be any of linear, branched or cyclic. $R^3$ may have a substituent, and examples of the substituent include a halogen atom, for example, F, Cl, Br, etc., an amino group and the like. In the case where each of $R^1$ and $R^2$ has an aromatic ring or a heterocyclic ring, examples of the substituent include, in addition to those described above, an alkoxy group; a linear, branched or cyclic alkyl group, alkenyl group or alkylidine group each having from 1 to 4 carbon atoms; a functional group containing a sulfur atom or a nitrogen atom, such as a thiol group, an alkylthio group having from 1 to 10 carbon atoms, an amino group, a cyano group, an alkylamino group having from 1 to 10 carbon atoms, etc.; and the like. In the case where $R^3$ has an aromatic ring or a heterocyclic ring, the atoms constituting the subject cyclic system may include a hetero atom such as a nitrogen atom, an oxygen atom, a sulfur atom, etc. The foregoing groups of $R^3$ are merely an example, and, for example, the group having an aromatic ring or a heterocyclic ring may be any of a polycyclic ring or a condensed polycyclic ring, in addition to a monocyclic ring. Plural $R^3$s may be the same as or different from each other.

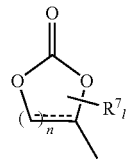

(6)

In the formula (6), $R^7$ represents a halogen atom; a monovalent group such as an alkyl group having from 1 to 10 carbon atoms, an alkenyl group having from 2 to 10 carbon atoms, a benzyl group, a phenyl group, a pyridyl group, a benzothiazole group, a biphenyl group, a pyridylphenyl group, a cycloalkyl group having from 3 to 10 carbon atoms, a cycloalkene group having from 3 to 10 carbon atoms, etc.; or a divalent group such as an alkylene group having from 1 to 10 carbon atoms, an alkenylene group having from 2 to 10 carbon atoms, a phenylene group, a cycloalkenyl group having from 3 to 10 carbon atoms, a cycloalkenylene group having from 3 to 10 carbon atoms, etc. n represents an integer of from 1 to 4; and l represents an integer of from 0 to (2×n). Each of the alkyl group, the alkenyl group, the alkylene group and the alkenylene group in $R^7$ may be any of linear, branched or cyclic. $R^7$ may have a substituent, and examples of the substituent include a halogen atom, for example, F, Cl, Br, etc., an amino group and the like. In the case where each of $R^1$ and $R^2$ has an aromatic ring or a heterocyclic ring, examples of the substituent include, in addition to those described above, an alkoxy group; a linear, branched or cyclic alkyl group, alkenyl group or alkylidine group each having from 1 to 4 carbon atoms; a functional group containing a sulfur atom or a nitrogen atom, such as a thiol group, an alkylthio group having from 1 to 10 carbon atoms, an amino group, a cyano group, an alkylamino group having from 1 to 10 carbon atoms, etc.; and the like. In the case where $R^7$ has an aromatic ring or a heterocyclic ring, the atoms constituting the subject cyclic system may include a hetero atom such as a nitrogen atom, an oxygen atom, a sulfur atom, etc. The foregoing groups of $R^7$ are merely an example, and, for example, the group having an aromatic ring or a heterocyclic ring may be any of a polycyclic ring or a condensed polycyclic ring, in addition to a monocyclic ring. Plural $R^7$s may be the same as or different from each other.

Examples of the chain carbonate compound represented by the foregoing general formula (3) include dimethyl carbonate, diethyl carbonate, 1-chloroethylethyl carbonate, dipropyl carbonate, allylmethyl carbonate, diallyl carbonate, diisobutyl carbonate, ethylphenyl carbonate, diphenyl carbonate, dibenzyl carbonate, ethyl-m-tolyl carbonate, ethyl-3,5-xylyl carbonate, tert-butylphenyl carbonate, tert-butyl-4-vinylphenyl carbonate, di-p-tolyl carbonate, tert-butyl-8-quinolinyl carbonate, α-dichlorobenzylmethyl carbonate, bistrichloroethyl carbonate, 1-chloroethyl-4-chlorophenyl carbonate, tert-butyl-2,4,5-trichlorophenyl carbonate, methyl-2,3,4,6-tetrachlorophenyl carbonate, isopropyl-2,3,4,6-tetrachlorophenyl carbonate, tert-butyl-4-formylphenyl carbonate, 1-chloroethyl-3-trifluoromethylphenyl carbonate, 4-methoxybenzylphenyl carbonate, 4-methoxyphenyl-N-(butoxycarbonyloxymethyl) carbonate, bis-nitrophenyl carbonate, bis-(2-methoxycarbonylphenyl) carbonate, methyl-2-methyl-6-nitrophenyl carbonate, ethyl-3-methyl-4-nitrophenyl carbonate, benzyl-4-nitrophenyl carbonate, 4-nitrophenyl-2-trimethylsilylethyl carbonate, 2,4-dinitro-1-naphthylmethyl carbonate, 3,6-dichloro-2,4-dinitrophenylethyl carbonate, 2-sec-butyl-4,6-dinitrophenylpropyl carbonate, 2-sec-butyl- 4,6-dinitrophenylisopropyl carbonate, 4-nitrophenyl[(2S,3S)-3-phenyl-2-oxiranyl]methyl carbonate, 2,4-dichloro-6-nitrophenylmethyl carbonate, 2-chloro-4-fluoro-5-nitrophenylethyl carbonate, methyl-2-methyl-4,6-dinitrophenyl carbonate, 2-chloro-4-methyl-6-nitrophenylisopropyl carbonate, 4-chloro-3,5-dimethyl-2,6-dinitrophenylmethyl carbonate, 2-methylsulfonylethyl-4-nitrophenyl carbonate, ethyl-4-sulfo-1-naphthyl carbonate, 3-dimethylaminopropylethyl carbonate, ethyl-4-phenylazophenyl carbonate, 4-chloro-3,5-dimethylphenylmethyl carbonate, 1,3-benzothiazol-2-yl-2-propynyl carbonate, isobutyl-3-oxo-3H-phenoxazin-7-yl carbonate, 4-(iminomethylene-sulfenyl)-2,5-dimethylphenylmethyl, 5-o-methoxycarbonyl-1,2-o-(1-methylethylidene)-α-D-xylofuranose, ethylene glycol bis-(methyl carbonate), o-carbomethoxy-salicylic acid, carboxylic acid-1,1-dimethyl-2-oxopropyl ester methyl ester, carboxylic acid-di-o-tolyl ester, carboxylic acid-2-ethynylcyclohexyl ester phenyl ester, carboxylic acid-ethyl ester-(2-oxobenzotriazol-3-yl)methyl ester, carboxylic acid-2-chloroethyl ester-(2-oxobenzotriazol-3-yl) ester, carboxylic acid-allyl ester-(2-oxobenzothiazol-3-yl)methyl ester, carboxylic acid-hexyl ester-(2-oxobenzothiazol-3-yl)methyl ester, carboxylic acid-benzyl ester-(2-oxobenzothiazol-3-yl)methyl ester, carboxylic acid-(dinaphthalen-1-yl) ester, dimethyl dicarbonate, diethyl dicarbonate, di-tert-butyl dicarbonate, di-tert-amyl dicarbonate, diallyl dicarbonate, dibenzyl dicarbonate and the like.

Examples of the cyclic carbonate compound represented by the foregoing general formula (4) include ethylene carbonate, propylene carbonate, vinylene carbonate, 1,3-dioxan-2-one, 4-vinyl-1,3-dioxolan-2-one, 4-hydroxymethyl-1,3-dioxolan-2-one, 4-methoxymethyl-1,3-dioxolan-2-one, 4-chloro-1,3-dioxolan-2-one, 4,4-dimethyl-5-methylene-1,3-dioxolan-2-one, (chloromethyl)ethylene carbonate, 5,5-diethyl-1,3-dioxan-2-one, 5-methyl-5-propyl-1,3-dioxan-2-one, erythritol biscarbonate, 4,5-diphenyl-1,3-dioxol-2-one, 4,6-diphenylhieno-[3,4-d]-1,3-dioxol-2-one 5,5-dioxide and the like.

Of the foregoing compounds, dimethyl carbonate, diethyl carbonate, diphenyl carbonate and trimethylene carbonate are preferable as the chain carbonate compound represented by the general formula (3); ethylene carbonate and propylene carbonate are preferable as the cyclic carbonate compound represented by the general formula (4); and ethylene carbonate and propylene carbonate, both of which are the cyclic carbonate compound, are more preferable from the viewpoint of reactivity with the polyamine.

<Production of Amine Based Epoxy Resin Curing Agent>

The reaction product of (A), (B) and (D), or the reaction product of (A), (B), (C) and (D), each of which constitutes the amine based epoxy resin curing agent of the present invention, is obtained through a reaction of (A) with (B) and (D) or with (B), (C) and (D). Though the reaction can be achieved in an arbitrary order of (B) and (D), or (B), (C) and (D), or by mixing them, it is preferable to allow (A) to react first with (B).

In the case of using a carboxylic acid, an ester or an amide as (B), the reaction of (A) and (B) is carried out by mixing (A) and (B) under a condition at from 0 to 100° C. and performing an amide group forming reaction by means of dehydration, alcohol removal or amine removal under a condition at from 100 to 300° C., and preferably from 130 to 250° C.

During the amide group forming reaction, in order to complete the reaction, the inside of the reaction device can also be subjected to a pressure reducing treatment in a final stage of the reaction as the need arises. Dilution with a non-reactive solvent can also be achieved as the need arises. Furthermore, a catalyst such as phosphorous esters, etc. can also be added as a dehydrating agent or an alcohol-removing agent.

On the other hand, in the case of using an acid anhydride or an acid chloride as (B), the reaction is carried out by performing an amide group forming reaction after mixing under a condition at from 0 to 150° C., and preferably from 0 to 100° C.

During the amide group forming reaction, in order to complete the reaction, the inside of the reaction device can also be subjected to a pressure reducing treatment in a final stage of the reaction as the need arises. Dilution with a non-reactive solvent can also be achieved as the need arises. Furthermore, a tertiary amine such as pyridine, picoline, lutidine, trialkylamines, etc. can also be added.

The amide group site which is introduced by the foregoing reaction has a high cohesive force, and in view of the fact that the amide group site is present in a high proportion in the amine based epoxy resin curing agent, a higher oxygen barrier property and a good adhesive strength to a substrate such as metals, concretes, plastics, etc. can be imparted to the epoxy resin composition.

Also, a reaction ratio between (A) and (B) is preferably in the range of from 0.3 to 0.95 in terms of a molar ratio ((B)/(A)). By making the reaction ratio fall within the foregoing range, not only a sufficient amount of the amide group is formed in the amine based epoxy resin curing agent, but an amount of the amino group necessary for the reaction with the epoxy resin is secured. Therefore, it is possible to impart a high gas barrier property and an excellent performance of coating film to the epoxy resin composition and to obtain an amine based epoxy resin curing agent with a good workability at the time of coating.

The reaction of (A) and (D) is carried out by mixing (A) and (D) under a condition at from 40 to 200° C. and performing a carbamate group forming reaction by means of an addition reaction under a condition at from 40 to 200° C., and preferably from 60 to 180° C. Also, a catalyst such as sodium methoxide, sodium ethoxide, tert-butylpotassium methoxide, etc. can be used as the need arises.

During the carbamate site forming reaction, for the purpose of promoting the reaction, (D) can also be melted or diluted with a non-reactive solvent as the need arises.

The carbamate site which is introduced by the foregoing reaction has a high cohesive force and characteristics such as reduction of the reactivity between the epoxy resin and the amine based epoxy resin curing agent. In view of this fact, since the amine based epoxy resin curing agent has a carbamate site in a high proportion, a high oxygen barrier property, a good adhesive strength to a substrate such as metals, concretes, plastics, etc. and a good workability such as a longer pot life can be imparted to the epoxy resin composition.

Also, a reaction ratio between (A) and (D) can be arbitrarily set up within the range of from 0.05 to 1.5 in terms of a molar ratio ((D)/(A)) and is preferably in the range of from 0.1 to 0.7. By making the reaction ratio fall within the foregoing range, a sufficient amount of the carbamate site is formed in the amine based epoxy resin curing agent, and a good amine based epoxy resin curing agent capable of imparting a high gas barrier property and a long pot life to the epoxy resin composition can be obtained.

The reaction of (A) and (C) can be carried out under the same condition as in the reaction of (A) and (B).

In carrying out the reaction of (A), (B) and (D) or the reaction of (A), (B), (C) and (D), though a ratio of each of (B), (C) and (D) is not restricted, the total sum of a number of the carbon-carbon double bond of (B), a double number of the acyl group number of (B), a number of the carboxyl group and its derived functional group of (C) and a number of the carbonate site of (D) is preferably in the range of from 1.00 to 3.99, and more preferably in the range of from 1.50 to 3.95 per mole of (A). By making the ratio of each of (B), (C) and (D) fall within the foregoing range, not only sufficient amounts of the amide group and the carbamate site are formed in the amine based epoxy resin curing agent, but an amount of the amino group necessary for the reaction with the epoxy resin is secured. Therefore, it is possible to impart a high gas barrier property and an excellent performance of coating film to the epoxy resin composition and to impart a good workability at the time of coating.

Furthermore, from the viewpoint of imparting a high gas barrier property, a long pot life and good adhesiveness to the epoxy resin composition of the present invention, a reaction molar ratio of (A), (B) and (D) ((A)/(B)/(D)) is in the range of 1/(from 0.7 to 0.95)/(from 0.1 to 0.7), preferably 1/(from 0.75 to 0.9)/(from 0.1 to 0.5), and especially preferably 1/(from 0.8 to 0.9)/(from 0.1 to 0.4); and it is preferable to use an amine based epoxy resin curing agent in which an average molecular weight of an oligomer as a reaction product is increased.

Also, in the case of applying the amine based epoxy resin curing agent to the epoxy resin composition, the epoxy resin curing agent is more preferably a reaction product among (a) m-xylylenediamine, (b) acrylic acid, methacrylic acid and/or a derivative thereof and (d) ethylene carbonate, propylene carbonate or trimethylene carbonate. Here, a reaction molar ratio of (a), (b) and (d) ((a)/(b)/(d)) is preferably 1/(from 0.7 to 0.95)/(from 0.1 to 0.7), more preferably 1/(from 0.75 to 0.9)/(from 0.1 to 0.5), and especially preferably 1/(from 0.8 to 0.9)/(from 0.1 to 0.4).

[Epoxy Resin Composition]

The epoxy resin composition of the present invention includes the foregoing amine based epoxy resin curing agent and epoxy resin. It is preferable that the subject epoxy resin composition has an oxygen barrier property such that its coefficient of oxygen permeability of a cured material obtained by curing the subject composition is not more than 1.0 mL·mm/m$^2$·day·MPa (at 23° C. and 60% RH).

<Epoxy Resin>

Though the foregoing epoxy resin may be any of a saturated or unsaturated aliphatic compound, alicyclic compound, aromatic compound or heterocyclic compound, in the case of taking into consideration revealment of a high gas barrier property, an epoxy resin containing an aromatic ring in a molecule thereof is preferable. As specific examples of the epoxy resin, there is preferably exemplified at least one resin selected among an epoxy resin having a glycidylamino group derived from m-xylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and/or a glycidyloxy group derived from p-aminophenol, an epoxy resin having a glycidyloxy group derived from bisphenol A, an epoxy resin having a glycidyloxy group derived from bisphenol F, an epoxy resin having a glycidyloxy group derived from phenol novolak and an epoxy resin having a glycidyloxy group derived from resorcinol.

Of these, an epoxy resin having a glycidylamino group derived from m-xylylenediamine is especially preferable.

Also, for the purpose of enhancing various performances such as flexibility, impact resistance, resistance to moist heat, etc., the foregoing various epoxy resins can be used upon being mixed in an adequate proportion.

The foregoing epoxy resin is obtained through a reaction of an alcohol, a phenol or an amine of every kind with epichlorohydrin. For example, an epoxy resin having a glycidylamino group derived from m-xylylenediamine is obtained by adding epichlorohydrin to m-xylylenediamine. Since m-xylylenediamine has four amino hydrogens, mono-, di-, tri- and tetraglycidyl compounds are formed. The number of the glycidyl group can be changed by altering a reaction ratio of m-xylylenediamine and epichlorohydrin. For example, an epoxy resin chiefly having four glycidyl groups is obtained through an addition reaction of m-xylylenediamine with about 4 molar times of epichlorohydrin.

The foregoing epoxy resin is synthesized by allowing an alcohol, a phenol or an amine of every kind with an excess of epichlorohydrin in the presence of an alkali such as sodium hydroxide, etc. under a temperature condition at from 20 to 140° C., and preferably from 50 to 120° C. in the case of using an alcohol or a phenol and at from 20 to 70° C. in the case of using an amine, respectively and separating a formed alkali halide.

Though a number average molecular weight of the formed epoxy resin varies depending upon a molar ratio of epichlorohydrin to the alcohol, phenol or amine of every kind, it is from about 80 to 4,000, preferably from about 200 to 1,000, and more preferably from about 200 to 500.

Though a curing reaction of the epoxy resin composition of the present invention is carried out at concentration and temperature of the epoxy resin composition sufficient for obtaining its epoxy resin cured material, they are variable by selecting components of the epoxy resin composition. That is, the concentration of the epoxy resin composition cannot be unequivocally specified because the epoxy resin composition can take various states including from the case where no solvent is used to the case where the concentration of the composition is about 5% by mass by using a certain kind of an adequate organic solvent and/or water, by the kind or molar ratio or the like of the selected material. A curing reaction temperature can be properly selected within the range of from room temperature to about 140° C.

As the organic solvent which is used for this curing reaction, there are preferably exemplified glycol ethers such as 2-methoxyethanol, 2-ethoxyethanol, 2-propoxyethanol, 2-butoxyethanol, 1-methoxy-2-propanol, 1-ethoxy-2-propanol, 1-propoxy-2-propanol, etc.; alcohols such as methanol, ethanol, 1-propanol, 2-propanol, 1-butanol, 2-butanol, etc.; aprotic polar solvents such as N,N-dimethylformamide, N,N-dimethylacetamide, dimethyl sulfoxide, N-methylpyrrolidone, etc.; water-insoluble solvents such as toluene, xylene, ethyl acetate, etc.; and the like. Of these, water-soluble solvents such as glycol ethers, alcohols, etc. are more preferable.

A blending proportion of the epoxy resin and the amine based epoxy resin curing agent in the foregoing epoxy resin composition may be a standard blending range in the case where an epoxy resin reaction product is generally prepared through a reaction of an epoxy resin and an amine based curing agent. Specifically, a ratio of a number of active amine hydrogen in the amine based epoxy resin curing agent to a number of the epoxy group in the epoxy resin is preferably in the range of from 0.5 to 5.0, and more preferably in the range of from 0.8 to 3.0.

In the case of coating the foregoing epoxy resin composition on a general substrate such as metals, concretes, plastics, etc., in order to help wetting of the surface of the substrate of every kind, the epoxy resin composition may be a composition in which a wetting agent such as a silicon or acrylic compound is added. Examples of an adequate wetting agent include BYK331, BYK333, BYK340, BYK347, BYK348, BYK378 and BYK381, all of which are available from BYK- Chemie GmbH, and the like. In the case of adding such a material, its addition amount is preferably in the range of from 0.01% by mass to 2.0% by mass on the basis of the whole mass of the epoxy resin composition.

Also, in order to enhance various performances such as impact resistance, etc., the epoxy resin composition may be a composition in which an inorganic filler such as silica, alumina, mica, talc, aluminum flakes, glass flakes, etc. is added. In the case of adding such a material, its addition amount is preferably in the range of from 0.01% by mass to 10.0% by mass on the basis of the whole mass of the epoxy resin composition.

The epoxy resin composition obtained from the foregoing amine based epoxy resin curing agent is useful as an adhesive for various gas permeable substrates, for example, plastic films to be used for applications of packaging materials of foods, pharmaceutical products, etc., such as polyolefins, polyesters, polyamides, etc. Also, the epoxy resin composition can be used as a coating material for coating on a plastic container, etc. or for a coating material to be coated, in which a conventional epoxy resin coating material is used, such as metals, concretes, etc.

[Adhesive for Laminate]

The adhesive for laminate of the present invention comprises, as a main component, an epoxy resin composition composed of an epoxy resin and an amine based epoxy resin curing agent. In view of the fact that the epoxy resin curing agent of the present invention has a gas barrier property and adhesiveness and contains a reaction product of a carbonate capable of lowering reactivity with the epoxy resin, the adhesive for laminate containing the subject amine based epoxy resin curing agent has a good workability such as a long pot life as well as a high gas barrier property and adhesiveness at the same time.

The adhesive for laminate of the present invention is suitably useful for various gas permeable substrates, for example, plastic films or plastic containers to be used as a packaging material of foods, pharmaceutical products, etc., which are made of a polyolefin, a polyester, a polyamide, etc., or coating materials to be coated, in which a conventional epoxy resin composition is used, such as metals, concretes, etc. Furthermore, in view of the fact that the epoxy resin cured material obtained through curing of an epoxy resin composition for forming an adhesive layer contains a urethane group and an amide group each having a high cohesive force, it has a higher gas barrier property and a good adhesive strength to a substrate such as metals, concretes, plastics, etc.

<Amine Based Epoxy Resin Curing Agent>

The amine based epoxy resin curing agent which is used for the adhesive for laminate of the present invention comprises a reaction product of the following (A), (B) and (D) or a reaction product of the following (A), (B), (C) and (D):

(A) m-xylylenediamine or p-xylylenediamine, (B) a polyfunctional compound having at least one acyl group, which is capable of forming an amide group site through a reaction with a polyamine and forming an oligomer, (C) a monovalent carboxylic acid having from 1 to 8 carbon atoms and/or its derivative, and (D) a functional compound having at least one carbonate site represented by the foregoing formula (2), which is capable of forming a carbamate site represented by the foregoing formula (1) through a reaction with a polyamine.

These (A) to (D) are the same as (A) to (D) of the foregoing amine based epoxy resin curing agent of the present invention, and the reaction method (reaction condition such as a reaction molar ratio, etc.) is also the same as that described above. In the case of applying this amine based epoxy resin curing agent to an adhesive for laminate, from the standpoints of a reaction molar ratio among (A) to (D) and the like, it is preferable that the following characteristic features are provided.

A reaction molar ratio of (A), (B) and (D) ((A)/(B)/(D)) is in the range of 1/(from 0.7 to 0.95)/(from 0.1 to 0.7), preferably 1/(from 0.75 to 0.9)/(from 0.1 to 0.5), and especially preferably 1/(from 0.8 to 0.9)/(from 0.1 to 0.4); and it is preferable to use an amine based epoxy resin curing agent in which an average molecular weight of an oligomer as a reaction product is increased. By making the molar ratio of (A), (B) and (D) fall within the foregoing range, it is possible to impart a high gas barrier property, a long pot life and good adhesiveness to the adhesive for laminate of the present invention.

Also, in the case of applying the amine based epoxy resin curing agent to an adhesive for laminate, the epoxy resin curing agent is more preferably a reaction product among (a) m-xylylenediamine, (b) acrylic acid, methacrylic acid and/or a derivative thereof and (d) ethylene carbonate, propylene carbonate or trimethylene carbonate. Here, a reaction molar ratio of (a), (b) and (d) ((a)/(b)/(d)) is preferably 1/(from 0.7 to 0.95)/(from 0.1 to 0.7), more preferably 1/(from 0.75 to 0.9)/(from 0.1 to 0.5), and especially preferably 1/(from 0.8 to 0.9)/(from 0.1 to 0.4).

<Epoxy Resin>

The epoxy resin which is used for the adhesive for laminate of the present invention is the same as that used in the foregoing epoxy resin composition of the present invention. In the case of applying this epoxy resin to the adhesive for laminate of the present invention, the epoxy resin is preferably one comprising, as a main component, an epoxy resin having a glycidylamino group derived from m-xylylenediamine and/or an epoxy resin having a glycidyloxy group derived from bisphenol F, and especially preferably one comprising, as a main component, an epoxy resin having a glycidylamino group derived from m-xylylenediamine.

A blending proportion of the epoxy resin and the epoxy resin curing agent in the epoxy resin composition which is a main component of the adhesive for laminate in the present invention may be a standard blending range in the case where an epoxy resin cured material is generally prepared through a reaction of an epoxy resin and an epoxy resin cured material. Specifically, a ratio of a number of active amine hydrogen in the epoxy resin curing agent to a number of the epoxy group in the epoxy resin is in the range of from 0.2 to 5.0, preferably 0.2 to 4.0, and more preferably of from 0.3 to 3.0. By making the blending ratio fall within the foregoing range, it is possible to impart a good gas barrier property and adhesiveness to the adhesive for laminate of the present invention.

<Additive>

In the present invention, various additives can be used according to desired performances.

The foregoing epoxy resin composition may be mixed with a thermosetting resin composition such as polyurethane based resin compositions, polyacrylic resin compositions, polyurea based resin compositions, etc. so far as the effects of the present invention are not impaired.

In coating the adhesive for laminate of the present invention on a film material of every kind, in order to help wetting of the surface, a wetting agent such as a silicon or acrylic compound may be added to the foregoing epoxy resin composition. Examples of an adequate wetting agent include BYK331, BYK333, BYK340, BYK347, BYK348, BYK354, BYK380 and BYK381, all of which are available from BYK-Chemie GmbH, and the like. In the case of adding such a material, its addition amount is preferably in the range of from 0.01% by mass to 2.0% by mass on the basis of the whole mass of the epoxy resin composition.

For the purpose of enhancing tackiness to a film material of every kind immediately after coating the foregoing epoxy resin composition on the film material of every kind, a tackifier such as xylene resins, terpene resins, phenol resins, rosin resins, etc. may be added thereto. In the case of adding such a material, its addition amount is preferably in the range of from 0.01% by mass to 5.0% by mass on the basis of the whole mass of the epoxy resin composition.

Also, for the purpose of increasing a low-temperature curing property, for example, curing promoting catalysts such as amine complexes of boron trifluoride, e.g., a boron trifluoride monoethylamine complex, etc., ether complexes of boron trifluoride, e.g., a boron trifluoride dimethyl ether complex, a boron trifluoride diethyl ether complex, a boron trifluoride di-n-butyl ether complex, etc., imidazoles, e.g., 2-phenylimidazole, etc., benzoic acid, salicylic acid, N-ethylmorpholine, dibutyltin dilaurate, cobalt naphthenate, stannous chloride, etc. can be added to the adhesive for laminate of the present invention.

In addition to the above, each of components such as organic solvents, for example, benzyl alcohol, etc.; rustproof additives, for example, zinc phosphate, iron phosphate, calcium molybdate, vanadium oxide, water-dispersed silica, fumed silica, etc.; organic pigments, for example, phthalocyanine based organic pigments, condensed polycyclic organic pigments, etc.; inorganic pigments, for example, titanium oxide, zinc oxide, calcium carbonate, barium sulfate, alumina, carbon black, etc.; and the like may be added in a necessary proportion.

Also, for the purpose of enhancing various performances of the adhesive layer which is formed by the adhesive for laminate of the present invention, inclusive of a gas barrier property, impact resistance, heat resistance, etc., an inorganic filler such as silica, alumina, mica, talc, aluminum flakes, glass flakes, etc. may be added to the adhesive for laminate. In the case of taking into consideration transparency of the film, such an inorganic filler is preferably in a tabular form. In the case of adding such a material, its addition amount is preferably in the range of from 0.01% by mass to 10.0% by mass on the basis of the whole mass of the epoxy resin composition.

Also, a compound having an oxygen-scavenging function or the like may be added to the adhesive for laminate of the present invention. Examples of the compound having an oxygen-scavenging function include low-molecular weight organic compounds capable of reacting with oxygen, such as hindered phenols, vitamin C, vitamin E, organic phosphorus compounds, gallic acid, pyrogallol, etc.; transition metal compounds of cobalt, manganese, nickel, iron, copper, etc.; and the like.

Furthermore, for the purpose of enhancing adhesiveness of the adhesive layer which is formed by the adhesive for laminate of the present invention to various film materials such as plastic films, metal foils, papers, etc., a coupling agent such as silane coupling agents, titanium coupling agents, etc. may be added to the adhesive for laminate. Examples of adequate silane coupling agents include amino based silane coupling agents such as N-(2-aminoethyl)-3-aminopropylmethyldimethoxysilane, N-(2-aminoethyl)-3-aminopropyltrimethoxysilane, 3-aminopropyltriethoxysilane, 3-aminopropyltrimethoxysilane, N,N'-bis[(3-trimethoxysilyl)propyl]ethylenediamine, etc.; epoxy based silane coupling agents such as 3-glycidoxypropyltrimethoxysilane, 3-glycidoxypropylmethyldimethoxysilane, 2-(3,4-epoxycyclohexyl)ethyltrimethoxysilane, 3-glycidoxypropyltriethoxysilane, etc.; methacryloxy based silane coupling agents such as 3-methacryloxypropyltrimethoxysilane, etc.; mercapto based silane coupling agents such as 3-mercaptopropyltrimethoxysilane, etc.; isocyanate based silane coupling agents such as 3-isocyanatopropyltriethoxysilane, etc.; and the like. Examples of commercially available products include, as an amino silane coupling agent, SILA-ACE 5310, S320, S330, S360 and XS1003, all of which are available from Chisso Corporation, SH-6026 and Z-6050, all of which are available from Dow Corning Toray Co., Ltd., and KBE-603, KBE-903, KP-390 and KC-223, all of which are available from Shin-Etsu Silicones; as an epoxy based silane coupling agent, SILA-ACE S510, 5520 and S530, all of which are available from Chisso Corporation, Z-6040, Z-6041, Z-6042 and Z-6044, all of which are available from Dow Corning Toray Co., Ltd., and KBM-403, KBE-402 and KBE-403, all of which are available from Shin-Etsu Silicones; as a methacryloxy based silane coupling agent, SILA-ACE S710 which is available from Chisso Corporation; and the like. In the case of adding such a material, its addition amount is preferably in the range of from 0.01% by mass to 5.0% by mass on the basis of the whole mass of the epoxy resin composition.

In the case of adding such a material, its addition amount is preferably in the range of from 0.01% by mass to 5.0% by mass on the basis of the whole mass of the epoxy resin composition.

[Laminated Film]

The adhesive for laminate of the present invention is suitably useful for laminated films obtained by laminating a film material of every kind. First of all, a laminated film having a substrate and a sealant layer (hereinafter referred to as "laminated film-1") is described.

<Laminated Film-1>

The adhesive for laminate of the present invention is suitably useful for laminated films obtained by laminating a film material of every kind, for example, a laminated film having a substrate and a sealant layer.

The laminated film-1 to which the adhesive for laminate of the present invention is applied is one obtained by properly selecting a film material of every kind and laminating at least a substrate and a sealant layer with a heat sealing property. In laminating the respective layers configuring the laminated film-1, an adhesive which is used in at least one adhesive layer is the adhesive for laminate of the present invention, and examples of the adhesive layer include an adhesive comprising an epoxy resin cured material obtained by curing an epoxy resin composition composed of an epoxy resin and an amine based epoxy resin curing agent, each of which is a main component of the adhesive for laminate. With respect to adhesive layers other than the adhesive layer using the subject adhesive for laminate, other adhesives such as polyurethane based adhesives, etc. may be used, or film materials may be welded with each other.

(Film Material)

Examples of the foregoing film material include polyolefin based films such as those of low density polyethylene, high density polyethylene, linear low density polyethylene, polypropylene, etc.; polyester based films such as those of polyethylene terephthalate, polybutylene terephthalate, etc.; polyamide based films such as those of nylon 6, nylon 6,6, m-xyleneadipamide (N-MXD6), etc.; polyacrylonitrile based films; poly(meth)acrylic films; polystyrene based films; polycarbonate based films; ethylene-vinyl acetate copolymer saponified material (EVOH) based films; polyvinyl alcohol based films; papers such as carton; metal foils such as those of aluminum, copper, etc.; and the like. Examples also include films obtained by coating such a film material with a polymer of every kind such as polyvinylidene chloride (PVDC) resins, polyvinyl alcohol resins, ethylene-vinyl acetate copolymer saponified material based resins, acrylic resins, etc.; films obtained by vapor depositing such a film material with an inorganic compound or a metal of every kind such as silica, alumina, aluminum, etc.; films obtained by dispersing an inorganic filler or the like in such a film material; films obtained by imparting an oxygen-scavenging function to such a film material; and the like.

The polymer of every kind which is used for the foregoing coating may be a polymer having an inorganic filler dispersed therein. Though examples of the inorganic filler include silica, alumina, mica, talc, aluminum flakes, glass flakes and the like, a layered silicate such as montmorillonite, etc. is preferable. Also, as a dispersing method thereof, there can be adopted conventionally known methods, for example, an extrusion kneading method, a mixing and dispersing method into a resin solution, etc. Also, examples of the foregoing method for imparting an oxygen-scavenging function include a method for using a composition containing, for example, a low-molecular weight organic compound capable of reacting with oxygen, such as hindered phenols, vitamin C, vitamin E, organic phosphorus compounds, gallic acid, pyrogallol, etc.; a transition metal compound of cobalt, manganese, nickel, iron, copper, etc.; or the like in at least a part thereof, and the like.

A thickness of the film material is from about 100 to 300 μm, and preferably, a thickness of from about 10 to 100 μm is practical. Also, of the foregoing film materials, in the case of a plastic film, it may be a uniaxially or biaxially stretched film.

In order that an adhesive layer which is free from defects such as film breakage, cissing, etc. may be formed, it is desirable that the surface of such a film material is subjected to a surface treatment of every kind such as a flame treatment, a corona discharge treatment, etc. as the need arises. Such a treatment promotes good adhesion of the adhesive layer to the film material of every kind.

Also, after subjecting the surface of the film material to an adequate surface treatment, a printed layer can be provided as the need arises. The printed layer can be provided by general printing equipment which has hitherto been used for printing on a polymer film, such as a gravure printing machine, a flexo printing machine, an offset printing machine, etc. Also, examples of an ink for forming the printed layer include inks which have hitherto been used for a printed layer on a polymer film and which are made of a pigment such as azo based or phthalocyanine based pigments, etc.; a resin such as rosin, polyamide resins, polyurethanes, etc.; a solvent such as methanol, ethyl acetate, methyl ethyl ketone, etc.; and the like.

Of these film materials, taking into consideration revealment of a good heat sealing property, a polyethylene film, a polypropylene film or a polyolefin based film of an ethylene-vinyl acetate copolymer, etc. is preferable as a flexible polymer film layer which will work as the sealant layer. Also, the substrate is preferably a film material such as stretched polypropylene, a polyamide based film, a polyethylene terephthalate film, etc. A thickness of such a film is from about 10 to 300 μm, and preferably, a thickness of from about 10 to 100 μm is practical; and the surface of the film may be subjected to a surface treatment of every kind such as a flame treatment, a corona discharge treatment, etc.

In the present invention, the coated surface of the adhesive may be provided with a primer (medium) layer. In that case, a primer having a chemical structure of every kind, which is any of a one-pack type or a two-pack type, can be used so far as it has adhesion to the substrate, and preferably, a polyester based primer with low permeability against an alcohol which is suitably used as a prime solvent of the adhesive, such as methanol, etc., is practical. Also, a thickness of the primer layer is from 0.01 to 20 μm, and preferably, a thickness of from 0.1 to 5 μm is practical. So far as the thickness of the primer layer falls within the foregoing range, sufficient adhesion can be secured, and it is easy to form a primer layer having a uniform thickness.

(Production Method of Laminated Film-1)
<<Preparation of Coating Solution>>

In the case of laminating the adhesive for laminate of the present invention upon being coated on a film material of every kind, though the lamination is carried out under a condition at concentration and temperature of the epoxy resin composition sufficient for obtaining an epoxy resin cured material for forming an adhesive layer, they are variable by selection of components of the epoxy resin composition and a laminating method. That is, the concentration of the epoxy resin composition varies depending upon the kind and molar ratio of a material to be selected in the epoxy resin composition, the laminating method and the like. Also, the concentration of the epoxy resin composition cannot be unequivocally specified because the adhesive for laminate containing it as a main component can take various states including from the case where no solvent is used to the case where it is used as coating solution diluted in a concentration of about 5% by mass by using a certain kind of an adequate organic solvent and/or water.

As the organic solvent which is used for the foregoing adhesive, any solvent having solubility with the epoxy resin composition is useful. As such an organic solvent, solvents with good solubility and having a relatively low boiling point, inclusive of alcohols having not more than 3 carbon atoms, are preferable, and examples thereof include solvents containing, as a main component, at least one member selected from the group consisting of methanol, ethanol, 2-propanol and 1-propanol. Also, the organic solvent is preferably a mixed solution having mixed therein a solvent having any one functional group of an ester group, a ketone group and an aldehyde group, which has an effect for delaying a reaction between the epoxy resin and the polyamine and suppressing thickening of the adhesive to prolong a working time. Examples of the foregoing mixed solution having mixed therein a solvent having any one functional group of an ester group, a ketone group and an aldehyde group include mixed solutions having mixed therein at least one member selected from the group consisting of methyl acetate, ethyl acetate, acetone, methyl ethyl ketone, acetaldehyde and propionaldehyde, each having a relatively low boiling point. In order to obtain a laminated film with a small amount of the residual solvent, a content of the solvent having any one functional group of an ester group, a ketone group and an aldehyde group is preferably not more than 20% by mass in the whole of solvents.

Here, in the case where the amount of the residual solvent in the laminated film is large, an offensive odor is caused, and therefore, an amount of the residual solvent of not more than 7 mg/m$^2$ is practical. So far as the amount of the residual solvent falls within the foregoing range, an offensive odor from the film is not felt. From the viewpoint of strictly controlling an odor of the film, the amount of the residual solvent in the film is preferably not more than 5 mg/m$^2$, and especially preferably not more than 3 mg/m$^2$.

The solvent-diluted adhesive (coating solution) may be diluted in a concentration so as to have a Zahn cup (No. 3) viscosity in the range of from 5 to 30 seconds (at 25° C.). So far as the Zahn cup (No. 3) viscosity falls within the foregoing range, the adhesive is sufficiently coated on a material to be coated; faults such as staining of a roll, etc. are not generated; the adhesive does not sufficiently move into a roll; and it does not become difficult to form a uniform adhesive layer. For example, in the case of adopting dry lamination for laminating the film material, it is preferable that the Zahn cup (No. 3) viscosity is from 10 to 20 seconds (at 25° C.) during the use.

In order to control foaming of the coating solution during preparing the foregoing coating solution, an antifoaming agent such as a silicon or acrylic compound may be added in the coating solution. Examples of the adequate antifoaming agent include BYK019, BYK052, BYK065, BYK066N, BYK067N, BYK070 and BYK080, all of which are available from BYK-Chemie GmbH, and the like, with BYK065 being preferable. In the case of adding such an antifoaming agent, its addition amount is preferably in the range of from 0.01% by mass to 3.0% by mass, and more preferably from 0.02% by mass to 2.0% by mass on the basis of the whole mass of the epoxy resin composition in the coating solution.

<<Laminating Method>>

In the case of laminating the film material of every kind using the adhesive for laminate (or coating solution) of the present invention, it is possible to adopt a known laminating method such as dry lamination, non-solvent lamination, extrusion lamination, etc. Of these, a dry laminating method is preferable.

In the case of a dry laminating method, the laminated film-1 can be obtained by coating the foregoing adhesive (or coating solution) on the substrate-including film material in a prescribed coating mode, then drying the solvent and immediately thereafter, sticking a new film material onto its surface by a nip roll.

Examples of the coating mode during coating the foregoing coating solution include generally adopted coating modes such as roll coating, spray coating, air knife coating, dipping, brush coating, etc. Of these, roll coating or spray coating is preferable.

In the dry laminating method, the adhesive (or coating solution) can be coated on a film material for forming a substrate or a sealant layer. The laminated film-1 can be produced by coating on a polyethylene film, a polypropylene film or a polyolefin based film of an ethylene-vinyl acetate copolymer, etc. and after drying, sticking thereonto a substrate such as stretched polypropylene, a polyamide based film, a polyethylene terephthalate film, etc.

With respect to a condition for the foregoing drying, though a drying temperature may be variously chosen within the range of from 20° C. to 140° C., it is desirably a temperature which is closed to a boiling point of the used solvent and which does not influence the material to be coated. So far as the drying temperature falls within the foregoing range, neither defective adhesion nor an offensive odor by the retention of the solvent in the laminated film-1 is caused, and the laminated film-1 with a good appearance is obtainable by means of softening of the polymer film or the like. Also, in coating the coating solution on a stretched polypropylene film, the drying temperature is desirably from 40° C. to 120° C.

Also, in the case of the foregoing sticking by a nip roll, sticking can be performed by heating the nip roll at from 20° C. to 120° C., and the heating temperature is desirably from 40 to 100° C.

In the dry laminating method, it is desirable that after laminating, aging is performed at from 20° C. to 60° C. for a fixed time as the need arises, thereby completing the curing reaction. By performing aging for a fixed time, the epoxy resin cured material is formed in a sufficient rate of reaction, whereby a high gas barrier property is revealed. So far as the aging condition falls within the foregoing range, the rate of reaction of the epoxy resin composition can be sufficiently secured. Therefore, sufficient gas barrier property and adhesive force are obtained, and problems such as blocking of the film material, elution of the additive, etc. are not caused.

In the case of a non-solvent laminating method, the laminated film-1 can be obtained by coating the foregoing adhesive which has been previously heated at from about 40° C. to 100° C. on the substrate-including film material by means of roll coating using a gravure roll heated at from 40° C. to 120° C., etc. and immediately thereafter, sticking a new film material onto its surface. In that case, similar to the case of a dry laminating method, it is desirable that after laminating, aging is performed for a fixed time as the need arises.

In the case of an extrusion laminating method, the laminated film-1 can be obtained by roll coating, as an adhesive aid (anchor coating agent), a diluted solution of an epoxy resin and an epoxy resin curing agent, each of which is a main component of the foregoing adhesive, with an organic solvent and/or water on a substrate-including film material by means of roll coating using a gravure roll, etc., drying the solvent, performing a curing reaction at from 20° C. to 140° C. and then laminating a molten polymer by an extruder. The material to be melted is preferably a low density polyethylene resin, a linear low density polyethylene resin or a polyolefin based resin such as an ethylene-vinyl acetate copolymer resin, etc.

These laminating methods and other generally employable laminating methods can be combined as the need arises, and a layer configuration of the laminated film-1 is variable depending upon its applications or forms.

A thickness of the adhesive layer after coating the foregoing adhesive (or coating solution) on the film material of every kind, drying, sticking and heat treating is from 0.1 to 100 μm, and preferably, a thickness of from 0.5 to 10 μm is practical. So far as the thickness of the adhesive layer falls within the foregoing range, sufficient gas barrier property and adhesiveness can be easily displayed, and an adhesive layer having a uniform thickness can be easily formed.

The thus obtained laminated film-1 may be one including at least one layer of an adhesive layer (gas barrier layer) composed of the foregoing epoxy resin cured material, and other layers can be selected among the foregoing film materials. For example, there are exemplified three-layer configurations such as a configuration consisting of polyolefin/epoxy resin cured material/polyolefin or polyamide/epoxy resin cured material/polyolefin, in which the epoxy resin cured material is an adhesive layer, etc., but it should not be construed that the present invention is limited thereto.

The foregoing laminated film-1 has an excellent laminating strength. A laminating strength of the laminated film-1 immediately after the lamination and before the heat treatment (aging) at a peeling rate of 300 mm/min is preferably 30 g/15 mm or more, more preferably 40 g/15 mm or more, and especially preferably 50 g/15 mm or more. In the case where this laminating strength is not sufficient, there are caused problems such as tunneling of the laminated film-1, winding deviation during winding up the film, etc.

A laminating strength after the heat treatment (aging) at a peeling rate of 300 mm/min varies depending upon the quality of the substrate or the sealant layer. For example, in the case where the substrate is made of stretched polypropylene, the laminating strength is preferably 80 g/15 mm or more, more preferably 100 g/15 mm or more, and especially preferably 120 g/15 mm or more. On the other hand, in the case where the substrate is made of stretched nylon or polyethylene terephthalate, when the sealant layer is made of low density polyethylene, the laminating strength is preferably 600 g/15 mm or more, more preferably 700 g/15 mm or more, and especially preferably 800 g/15 mm or more; and when the sealant layer is made of non-stretched polypropylene, the laminating strength is preferably 300 g/15 mm or more, more preferably 400 g/15 mm or more, and especially preferably 500 g/15 mm or more.

Also, in the foregoing laminated film-1, it is preferable that the adhesive layer composed of an epoxy resin cured material has an oxygen barrier property such that its coefficient of oxygen permeability is not more than 1.0 mL·mm/m$^2$·day·MPa (at 23° C. and 60% RH).

(Application)

The laminated film-1 produced by using the adhesive for laminate of the present invention can be used as a multilayered packaging material aiming at protection of foods, pharmaceutical products, etc. The subject multilayered packaging material includes the laminated film-1. In the case of using the laminated film-1 as a multilayered packaging material, its layer configuration is variable depending upon the contents, use environment or use form. That is, the laminated film-1 can be used as a multilayered packaging material as it is, or an oxygen absorbing layer, a thermoplastic resin layer composed of a heat sealable resin, etc., a paper layer, a metal foil layer or the like can be further laminated on the laminated film-1 as the need arises. On that occasion, so far as at least one layer is laminated by using the adhesive for laminate of the present invention, the other layer may be laminated by using an adhesive other than the adhesive for laminate of the present invention or an anchor coating agent.

A packaging bag made of a soft packaging bag which is produced by using the foregoing multilayered packaging material, etc. is described. The packaging bag made of such a soft packaging bag or the like can be produced by using the foregoing multilayered packaging material, superimposing the surfaces of heat sealable resin layers thereof opposing to each other and thereafter, heat sealing an outer peripheral edge thereof to form a sealed part. For example, as a bag-making method thereof, there is exemplified a method in which the foregoing multilayered packaging material is folded, or the multilayered packaging materials are superimposed, the surfaces of the inner layers are made opposing to each other, and a peripheral edge thereof is heat sealed. Examples of the heat sealing form which can be adopted herein include a side seal type, a two-sided seal type, a three-sided seal type, a four-sided seal type, an envelope making seal type, a butt seaming type (pillow seal type), a ribbed seal type, a flat bottom seal type, a square bottom seal type, a gazette type and the like.

The packaging bag can take various forms depending upon the contents, use environment or use form, and examples of the form include a self-supporting packaging bag (standing pouch) and the like. Examples of the method for heat sealing include known methods such as bar sealing, rotating roll sealing, belt sealing, impulse sealing, high-frequency sealing, ultrasonic sealing and the like.

In the foregoing packaging bag, by filling the contents from an opening thereof and then heat sealing the opening, a packaging product using a packaging bag can be formed. Examples of the contents which can be filled in the packaging bag include confectioneries such as rice confectioneries, bean snacks, nuts, biscuits or cookies, wafer snacks, marshmallows, pies, semiperishable cakes, candies, snack foods, etc.; staples such as breads, snack noodles, instant noodles, dried noodles, pastas, aseptically packaged cooked rice, rice gruels, rice porridges, packaged rice cakes, cereal foods, etc.; processed agricultural products such as pickles, boiled beans, fermented soybeans, miso, freeze-dried bean curd, bean curd, nametake mushrooms, konjak jelly, processed edible wild plants, jams, peanut creams, salads, frozen vegetables, processed potatoes, etc.; processed livestock products such as hams, bacons, sausages, processed chickens, corn beefs, etc.; processed marine products such as fish hams or sausages, fish-paste products, kamaboko, layers, tsukudani, dried bonito, salted and fermented internal organs of fish, smoked salmon, karashi-mentaiko, etc.; fleshes such as peach, tangerine, pineapple, apple, pear, cherry, etc.; vegetables such as corn, asparagus, mushroom, onion, carrot, Japanese radish, potato, etc.; frozen ready prepared foods represented by a hamburger, a meatball, a marine fry, a gyoza, a croquette, etc.; precooked foods such as chilled ready prepared foods, etc.; dairy products such as a butter, a margarine, a cheese, a cream, an instant creamy powder, a refined powdered milk for childcare, etc.; liquid seasonings; and foods such as retort-pouch curry, pet foods, etc. Also, the foregoing packaging bag can be used as a packaging material for tobacco, a throwaway pocket warmer, pharmaceutical products, cosmetics, etc.

<Laminated Film-2>

Also, as another embodiment of the laminated film, there is exemplified a laminated film in which a substrate; a silica vapor deposited layer, an alumina vapor deposited layer or a silica/alumina binary vapor deposited layer; an adhesive layer formed by the adhesive for laminate of the present invention; and a sealant layer are laminated (hereinafter referred to as "laminated film-2").

(Substrate)

As the substrate which is used for the laminated film-2, the film materials used for the foregoing laminated film-1 may be used. Also, in the laminated film-2, as other layer than the foregoing substrate, silica vapor deposited layer or alumina vapor deposited layer, adhesive layer and sealant layer, the foregoing film material such as polyolefins, polyesters, etc. may further be laminated (for example, between the adhesive layer and the sealant layer). Furthermore, the film material to be laminated may be a material having silica or alumina vapor deposited thereon. In laminating various materials, the adhesive layer may be made of plural layers. Also, an adhesive other than the adhesive in the present invention (for example, polyurethane based adhesives) may be used jointly.

(Silica Vapor Deposited Layer, Alumina Vapor Deposited Layer and Silica/Alumina Binary Vapor Deposited Layer)

The silica vapor deposited layer or alumina binary vapor deposited layer which is used for the laminated film-2 is a layer formed by vapor depositing silica or alumina on the foregoing substrate. As a method for vapor deposition on the substrate of every kind, any of a physical vapor deposition method or a chemical vapor deposition method may be adopted. Also, the subject silica vapor deposited layer or alumina vapor deposited layer may be a silica/alumina binary vapor deposited layer having silica and alumina binary vapor deposited thereon.

(Coating Layer)

In the laminated film-2, a coating layer may be present between the vapor deposited layer and the adhesive layer. For forming the coating layer, a resin or the like is used. Examples of the resin include polyurethane based resins such as polyurethane resins, polyurethane-urea resins, acryl-modified urethane resins, acryl-modified urethane-urea resins, etc.; vinyl chloride-vinyl acetate copolymer based resins; rosin based resins such as rosin-modified maleic acid resins; polyamide based resins; polyester based resins; chlorinated olefin based resins such as chlorinated polypropylene resins; polyethylene-imine based resins; polybutadiene based resins; organic titanium based resins; and the like.

The formation of the coating layer can be carried out by dissolving such a resin in a solvent such as water, methanol, ethanol, 2-propanol, ethyl acetate, methyl ethyl ketone, toluene, etc. and coating the solution by a gravure method, a roll coating method or the like. Also, in forming the coating layer, general printing equipment which has hitherto been used for printing on a polymer film, such as a gravure printing machine, a flexo printing machine, an offset printing machine, etc., can be similarly applied.

In the case of forming the coating layer, its thickness is from 0.005 to 5 μm, and preferably, a thickness of from 0.01 to 3 μm is practical. So far as the thickness of the coating layer falls within the foregoing range, sufficient adhesion is obtainable, and it is easy to form a resin layer having a uniform thickness.

In the case of using a curable layer as the coating layer, any of a one-pack type or a two-pack type may be used; and in the case where it is intended to impart waterproofing or heat resistance, a two-pack type is practical.

Also, in order to impart other functionality to the coating layer, an additive may be added to the foregoing resin. For the purposes of enhancement of friction resistance, prevention of blocking, slipperiness, enhancement of heat resistance, impartation of antistatic property and the like, examples of the additive include waxes, dispersants, antistatics, surface modifiers and the like, and these materials are properly selected and used.

(Sealant Layer)

It is preferable to use a flexible polymer film as the sealant layer in the foregoing laminated film-2, and taking into consideration revealment of a good heat sealing property, it is preferable to select a polyethylene film, a polypropylene film or a polyolefin based film of an ethylene-vinyl acetate copolymer, etc. A thickness of such a film is from about 10 to 300 μm, and preferably, a thickness of from about 10 to 100 μm is practical. The surface of the film may be subjected to a surface treatment of every kind such as a flame treatment, a corona discharge treatment, etc.

<Epoxy Resin Cured Material Layer>

The epoxy resin cured material layer in the foregoing laminated film-2 is obtained through curing of the epoxy resin composition composed of an amine based epoxy resin curing agent and an epoxy resin according to the present invention.

A blending proportion of the epoxy resin and the epoxy resin curing agent constituting the epoxy resin composition of the laminated film-2 may be a standard blending range in the case where an epoxy resin cured material is generally prepared through a reaction of an epoxy resin and an epoxy resin curing agent. Specifically, a ratio of a number of active hydrogen in the epoxy resin curing agent to a number of the epoxy group in the epoxy resin is in the range of from 0.2 to 5.0, preferably from 0.2 to 4.0, and more preferably from 0.3 to 3.0. So far as this ratio falls within the foregoing range, good adhesion and gas barrier property can be revealed.

<Production Method of Laminated Film-2>

The laminated film-2 can be produced in the same manner as in the laminated film-1, except for preparing a substrate having provided thereon a silica vapor deposited layer, an alumina vapor deposited layer or a silica/alumina binary vapor deposited layer and providing the subject substrate with a coating layer as the need arises, specifically by adopting a known laminating method such as dry laminating, non-solvent laminating, extrusion laminating, etc. The silica vapor deposited layer, alumina vapor deposited layer or silica/alumina binary vapor deposited layer can be easily provided on the substrate by a known physical vapor deposition method or chemical vapor deposition method. Also, the formation of the coating layer is the same as that described above.

The thus obtained laminated film-2 has an excellent laminating strength. A laminating strength after the heat treatment at a peeling rate of 300 mm/min varies depending upon the quality of the substrate or the sealant layer. For example, in the case where the substrate is made of stretched polypropylene, the laminating strength is preferably 80 g/15 mm or more, more preferably 100 g/15 mm or more, and especially preferably 120 g/15 mm or more. On the other hand, in the case where the substrate is made of stretched nylon or polyethylene terephthalate, when the sealant layer is made of low density polyethylene, the laminating strength is preferably 600 g/15 mm or more, more preferably 700 g/15 mm or more, and especially preferably 800 g/15 mm or more; and when the sealant layer is made of non-stretched polypropylene, the laminating strength is preferably 300 g/15 mm or more, more preferably 400 g/15 mm or more, and especially preferably 500 g/15 mm or more.

Also, in the foregoing laminated film-2, it is preferable that the adhesive layer composed of an epoxy resin cured material has an oxygen barrier property such that its coefficient of oxygen permeability is not more than 1.0 mL·mm/$m^2$·day·MPa (at 23° C. and 60% RH).

(Application)

The laminated film-2 can be used as a multilayered packaging material aiming at protection of foods, pharmaceutical products, etc. The subject multilayered packaging material includes the laminated film. In the case of using the laminated film as a multilayered packaging material, its layer configuration is variable depending upon the contents, use environment or use form. That is, the laminated film of the present invention can be used as a multilayered packaging material as it is, or an oxygen absorbing layer, a thermoplastic resin layer composed of a heat sealable resin, etc., a paper layer, a metal foil layer or the like can be further laminated on the laminated film of the present invention as the need arises. On that occasion, the lamination may be performed by using the adhesive for laminate of the present invention, or the lamination may be performed by using other adhesive or an anchor coating agent.

[Bag-Shaped Container]

When the epoxy resin composition used for the foregoing adhesive for laminate is cured to form an epoxy resin cured material, it is suitably used for a gas barrier laminated film including an epoxy resin cured material layer composed of the subject epoxy resin cured material and a sealant layer composed of a heat sealable thermoplastic resin and a bag-shaped container obtained through bag-making of the subject laminated film.

The foregoing gas barrier laminated film has a configuration of at least three layers of substrate/epoxy resin cured material layer/sealant layer by, for example, laminating a substrate and a sealant layer by using an adhesive composed of the foregoing epoxy resin composition, but it should not be construed that the present invention is limited thereto. The gas barrier laminated film may have a multilayered configuration of four or more layers in which a film material of every kind capable of being used as a substrate is further laminated.

The substrate, the sealant layer and the like which are used in the foregoing bag-shaped container are the same as those in the foregoing laminated sheet-1. However, taking into consideration the application as a bag-shaped container, it is preferable that the gas barrier laminated film is a laminated film which is constituted of a substrate composed of a thermoplastic resin or paper, an adhesive layer composed of the foregoing epoxy resin cured material and a sealant layer.

In the foregoing gas barrier laminated film, in the lamination of at least one place, an epoxy resin cured material layer may be provided by coating the foregoing adhesive for laminate and curing it. In other places, other adhesives, for example, polyurethane based adhesives, etc. may be used, or film materials may be welded with each other. The gas barrier laminated film is obtained in the same manner as in the foregoing production method of laminated sheet-1.

Also, in the foregoing gas barrier laminated film, it is preferable that the epoxy resin cured material layer has an oxygen barrier property such that its coefficient of oxygen permeability is not more than $1.0$ mL·mm/m$^2$·day·MPa (at 23° C. and 60% RH).

A thickness of the adhesive layer after coating the foregoing adhesive on the film material of every kind, drying, sticking and heat treating is from 0.1 to 100 µm, and preferably, a thickness of from 0.5 to 10 µm is practical. So far as the thickness of the adhesive layer falls within the foregoing range, sufficient gas barrier property and adhesiveness can be imparted to the gas barrier laminated film, and an adhesive layer having a uniform thickness can be easily formed.

The foregoing laminated film has an excellent laminating strength. A laminating strength after the heat treatment at a peeling rate of 300 mm/min varies depending upon the quality of the substrate or the sealant layer. For example, in the case where the substrate is made of stretched polypropylene, the laminating strength is preferably 80 g/15 mm or more, more preferably 100 g/15 mm or more, and especially preferably 120 g/15 mm or more. On the other hand, in the case where the substrate is made of stretched nylon or polyethylene terephthalate, when the sealant layer is made of low density polyethylene, the laminating strength is preferably 600 g/15 mm or more, more preferably 700 g/15 mm or more, and especially preferably 800 g/15 mm or more; and when the sealant layer is made of non-stretched polypropylene, the laminating strength is preferably 300 g/15 mm or more, more preferably 400 g/15 mm or more, and especially preferably 500 g/15 mm or more. In the case where this laminating strength is not sufficient, there are caused problems such as tunneling of the laminated film, winding deviation during winding up the film, etc.

<Application>

The bag-shaped container obtained through bag-making of the foregoing gas barrier laminated film is suitably used for storing foods, chemicals or the like. The bag-making method may be the same as in bag-making of the foregoing laminated film-1. Examples of the foods include spice-containing foods, soy sauce, vinegar, sauce, coffee, black tea, cocoa, lemon fruit juice, curry powder and the like. Examples of the chemicals include methyl salicylate, limonene, L-menthol, naphthalene, p-chlorobenzene and the like. Also, limonene-containing foods or chemicals (limonene-containing products) may be included.

The foregoing "limonene-containing product" refers to a product of every kind containing limonene. Examples thereof include confectioneries such as rice confectioneries, bean snacks, nuts, biscuits or cookies, wafer snacks, marshmallows, pies, semiperishable cakes, candies, snack foods, etc.; staples such as cereal foods; processed agricultural products such as miso, freeze-dried bean curd, bean curd, nametake mushrooms, jams, peanut creams, salads, frozen vegetables, processed potatoes, etc.; fleshes or citrus fruits such as peach, tangerine, pineapple, apple, pear, cherry, orange, grapefruit, lemon, Citrus junos, etc.; precooked foods such as chilled ready prepared foods, etc.; dairy products such as a cream, a refined powdered milk for childcare, etc.; liquid seasonings; and foods such as pet foods, etc. Also, examples include liquid detergents such as a refilling shampoo or conditioner, a body soap, etc.; vermicides; deodorants; air fresheners; pharmaceutical products; cosmetics; and the like.

The foregoing spice-containing food refers to a product of every kind containing a spice of every kind. Examples of the subject spice include plants belonging to the Lamiaceae family such as mint, savory, basil, perilla, sweet marjoram, oregano, sage, thyme, rosemary, etc.; plants belonging to the Solanaceae family such as red pepper, paprika, etc.; plants belonging to the Pedaliaceae family such as sesame, etc.; plants belonging to the Asteraceae family such as tarragon, etc.; plants belonging to the Piperaceae family such as pepper, etc.; plants belonging to the Myristicaceae family such as nutmeg, mace, etc.; plants belonging to the Lauraceae family such as laurel, cinnamon, cassia, etc.; plants of the Magnoliaceae family such as star anise, etc.; plants of the Brassicaceae family such as mustard, wasabi, horseradish, etc.; plants belonging to the Leguminosae family such as fenugreek, etc.; plants belonging to the Rutaceae family such as Japanese pepper, etc.; plants belonging to the Myrtaceae family such as clove, allspice, etc.; plants belonging to the Apiaceae family such as dill, celery, caraway, coriander, cumin, fennel, parsley, anise, etc.; plants belonging to the Liliaceae family such as garlic, onion, etc.; plants belonging to the Iridaceae family such as saffron, etc.; plants belonging to the Zingiberaceae family such as ginger, turmeric, cardamom, etc.; and plants belonging to the Orchidaceae family such as vanilla beans, etc. In the present invention foods containing plants belonging to the Lamiaceae family, plants belonging to the Lauraceae family, plants belonging to the Brassicaceae family or plants belonging to the Myrtaceae family can be especially preferably stored. Besides, the foregoing bag-shaped container is also suitably useful for an application of a packaging bag which is produced from the foregoing laminated film.

[Gas Barrier Molded Container Using Gas Barrier Laminated Sheet]

The epoxy resin composition used for the foregoing adhesive for laminate can be used for a gas barrier molded container obtained by molding a gas barrier laminated sheet including at least one flexible polymer layer and at least one oxygen barrier layer upon being cured to form an oxygen barrier layer as an epoxy resin cured material.

<Flexible Polymer Layer>

Examples of a film or sheet material constituting the flexible polymer layer which is used for the gas barrier molded container include polyolefin based film or sheet materials such as low density polyethylene, high density polyethylene, linear low density polyethylene, etc.; polyamide based film or sheet materials such as nylon 6, nylon 6,6, poly-m-xylylene-adipamide (N-MXD6), etc.; polyester based film or sheet materials such as polyethylene terephthalate, polybutylene terephthalate, etc.; polyacrylonitrile based film or sheet materials; poly(meth)acrylic film or sheet materials; polystyrene based film or sheet materials; polycarbonate based film or sheet materials; ethylene-vinyl alcohol copolymer (EVOH) based film or sheet materials; polyvinyl alcohol based film or sheet materials; and the like. Of these, polyolefin based film or sheet materials and polyester based film or sheet materials such as polyethylene terephthalate, polybutylene terephthalate, etc. are more preferable because they have better adhesiveness.

Here, the foregoing flexible polymer layer may be a layer having other thermoplastic resin mixed therein or laminated thereon. As the subject thermoplastic resin, film materials the same as those in the foregoing laminated film-1 can be used.

The foregoing flexible polymer layer may be a layer which is stretched uniaxially or biaxially, or may be a foam of the polymer, and its thickness is practically from about 0.01 to 5 mm. Also, the printed layer and the primer layer as well as the surface treatment of every kind, such as a flame treatment, a corona discharge treatment, etc. are the same as those in the film material of the foregoing laminated film-1.

<Oxygen Barrier Layer>

The foregoing oxygen barrier layer is composed of an epoxy resin cured material which is obtained by curing an epoxy resin composition used for the foregoing adhesive for laminate. A thickness of the oxygen barrier layer after coating the foregoing adhesive on the film material and/or sheet material of every kind, drying, sticking and heat treating is from 0.1 to 100 μm, and preferably, a thickness of from 0.5 to 10 μm is practical. So far as the thickness of the oxygen barrier layer falls within the foregoing range, sufficient oxygen barrier property and adhesiveness can be secured, and an adhesive layer having a uniform thickness can be easily formed.

<Gas Barrier Laminated Sheet>

The foregoing gas barrier laminated sheet may be a sheet including at least one oxygen barrier layer composed of the foregoing epoxy resin cured material and at least one flexible polymer layer. For example, there are exemplified three-layer configurations such as a configuration consisting of polyolefin/epoxy resin cured material/polyolefin or polyamide/epoxy resin cured material/polyolefin, in which the epoxy resin cured material is an adhesive layer, etc., but it should not be construed that the present invention is limited thereto. The gas barrier laminated sheet may have a multilayered configuration of four or more layers in which an external layer composed of a thermoplastic resin, a thermoplastic resin layer with heat sealing property or the like is further laminated.

In laminating each of the layers constituting the foregoing gas barrier laminated sheet, in the lamination of at least one place, the oxygen barrier layer may be provided by coating the foregoing adhesive for laminate and curing it. In other places than the oxygen barrier layer using the subject adhesive, other adhesives, for example, polyurethane based adhesives, etc. may be used, or film or sheet materials may be welded with each other. The gas barrier laminated sheet is obtained in the same manner as in the foregoing production method of laminated film-1.

In the thus obtained gas barrier laminated sheet, it is preferable that the oxygen barrier layer has an oxygen barrier property such that its coefficient of oxygen permeability is not more than 1.0 mL·mm/m²·day·MPa (at 23° C. and 60% RH).

The foregoing epoxy resin composition is characterized in that in addition to suitable adhesiveness to a film material and/or a sheet material of every kind, a cured material obtained therefrom has a high oxygen barrier property, and it displays a high oxygen barrier property over a wide range including from a low-humidity condition to a high-humidity condition. According to this fact, the laminated sheet using the foregoing epoxy resin composition reveals a gas barrier property on a very high level without using generally used gas barrier materials such as a PVDC-coated layer, a polyvinyl alcohol (PVA)-coated layer, an ethylene-vinyl alcohol copolymer (EVOH) film layer, a poly-m-xylyleneadipamide film layer, an inorganic vapor deposited film layer having alumina, silica, etc. vapor deposited thereon, etc. Furthermore, since the foregoing epoxy resin cured material is excellent in toughness and resistance to moist heat, a gas barrier laminated sheet which is excellent in impact resistance, resistance to boiling treatment, resistance to retort treatment and the like is obtainable. The subject laminated sheet is suitably applicable to gas barrier molded containers while making the best use of its characteristic features.

This gas barrier laminated sheet can be used as a multilayered packaging container aiming at protection of foods, pharmaceutical products, etc. while making the best use of its excellent oxygen barrier property. In the case of using this laminated sheet as a multilayered packaging material, its layer configuration is variable depending upon the contents, use environment or use form. That is, the laminated sheet can be used as a multilayered packaging material as it is, or an oxygen absorbing layer, a thermoplastic resin film layer, a paper layer, a metal foil layer or the like can be further laminated thereon as the need arises. On that occasion, the lamination may be performed by using the adhesive for laminate of the present invention, or the lamination may be performed by using other adhesive or an anchor coating agent.

<Gas Barrier Molded Container>

The foregoing gas barrier molded container is obtainable by pressurizing and molding the foregoing gas barrier laminated sheet into a prescribed shape by a generally known heat molding method, for example, a molding method such as vacuum molding, pressure molding, hot plate molding, etc., or laminating the foregoing laminated sheet on another flexible film or sheet and pressurizing and molding the laminate into a prescribed shape by a molding method such as vacuum molding, pressure molding, hot plate molding, etc.

In the gas barrier molded container, a ratio (d/l) of a depth (d) of the container to a diameter (l) of an upper opening of the container is in the range of from 0.05 to 5.0, preferably from 0.1 to 3.0, and more preferably from 0.1 to 2.0 regardless of its appearance. In the case where a shape of the opening is an ellipse, the diameter of the upper opening of the container is its major axis, whereas in the case where a shape of the opening is a regular square, a rectangle or a polygon, the diameter of the upper opening of the container is the longest diagonal line. According to the present invention, it becomes possible to achieve molding of a deeply drawn container having a ratio (d/l) of a depth (d) of the container to a diameter (l) of an upper opening of the container of 1.0 or more, or a container (box-shaped container) including a portion with a large stretch ratio such that a radius (R) of a curve of a corner of the bottom is from 2 to 5 mm.

The gas barrier molded container is advantageous from the standpoint of storage of the contents because of low temperature dependency of the gas barrier property. Also, even in a deeply drawn container or a container with a large stretch ratio such as a box-shaped container, it is able to be molded into a shape of every kind adaptive with the contents because of good moldability.

[Printed Layer-Provided Gas Barrier Laminate]

By curing the epoxy resin composition which is used for the foregoing adhesive for laminate to form an epoxy resin cured material, it can be used for a gas barrier laminate in which a substrate, an epoxy resin cured material layer and a printed layer are laminated.

<Substrate>

As the substrate which is used for the printed layer-provided gas barrier laminate, the film materials used for the foregoing laminated film-1 are exemplified. A single-layered configuration or a multilayered structure of such a film material may be used. Also, for the purpose of enhancing adhesion between the substrate and an inorganic vapor deposited layer as described later, which is provided as the need arises, an anchor coating layer may be provided on the substrate.

<Inorganic Vapor Deposited Layer>

In the printed layer-provided gas barrier laminate, an inorganic vapor deposited layer composed of an inorganic oxide can be provided. This inorganic vapor deposited layer may be a layer which is composed of a vapor deposited film of an inorganic oxide of silicon, aluminum, magnesium, zinc, tin, nickel or a mixture thereof or the like and which has not only transparency but a gas barrier property against oxygen, water vapor, etc. Of these, taking into consideration resistance to sterilization of every kind, silicon oxide and aluminum oxide are especially preferable.

The subject inorganic vapor deposited layer is formed on the foregoing substrate by a vacuum process such as a vacuum vapor deposition method, a sputtering method, a plasma chemical vapor deposition method (CVD method), etc. A thickness of the inorganic vapor deposited layer is suitably in the range of from 20 to 6,000 angstroms. So far as the thickness of the inorganic vapor deposited layer falls within the foregoing range, the layer stably has continuity, is able to secure a gas barrier property and hardly generates cracks.

<Epoxy Resin Cured Material Layer>

The foregoing epoxy resin cured material layer is composed of an epoxy resin cured material obtained by curing an epoxy resin composition which is used for the foregoing adhesive for laminate. A thickness of the oxygen barrier layer after coating the foregoing adhesive on the film material and/or sheet material of every kind, drying, sticking and heat treating is from 0.1 to 100 μm, and preferably, a thickness of from 0.5 to 10 μm is practical. So far as the thickness of the oxygen barrier layer falls within the foregoing range, sufficient oxygen barrier property and adhesiveness can be secured, and an adhesive layer having a uniform thickness can be easily formed.

<Printed Layer>

The foregoing gas barrier laminate is provided with a printed layer. The printed layer is a coating film formed of an ink obtained by adding various pigments, extender pigments and stabilizers and the like to an ink binder resin which has hitherto been used, such as polyurethane based resins, for example, polyurethane resins, polyester based resins, polyurethane-urea resins, acryl-modified urethane resins, acryl-modified urethane-urea resins, etc.; vinyl chloride-vinyl acetate copolymer based resins; rosin based resins such as rosin-modified maleic acid resins; polyamide based resins; chlorinated olefin based resins, for example, chlorinated polypropylene resins, etc.; acrylic resins; nitrocellulose based resins; rubber based resins; and the like. Letters and patterns are formed by this ink coating film.

As the ink binder resin, polyurethane based resins and/or vinyl chloride-vinyl acetate copolymer based resins are preferable because they are relatively soft and have an adhesive force. Such a resin can be used singly or in admixture. The printed layer can be formed by dissolving such a resin in a solvent such as water, methanol, ethanol, 2-propanol, ethyl acetate, propyl acetate, butyl acetate, methyl ethyl ketone, toluene, etc. to form an ink and coating the subject ink by a gravure method, a roll coating method or the like. Also, in forming the printed layer, general printing equipment which has hitherto been used for printing on a polymer film, such as a gravure printing machine, a flexo printing machine, an offset printing machine, etc., can be similarly applied.

A thickness of the printed layer is desirably not more than 5 μm. So far as the thickness of the printed layer is not more than 5 μm, dryness of the ink does not become defective.

Though the ink for forming the printed layer (ink coating film) may be any of a one-pack type or a two-pack type, in the case of a two-pack type, it is desirable to use a polyisocyanate as a curing agent. Specific examples thereof include aromatic polyisocyanates such as toluene diisocyanate (TDI), diphenylmethane diisocyanate (MDI), etc.; and aliphatic polyisocyanates such as hexamethylene diisocyanate (HMDI), isophorone diisocyanate (IPDI), xylene diisocyanate (XDI), etc.

The solvent-diluted ink may be diluted in a concentration so as to have a Zahn cup (No. 3) viscosity in the range of from 5 to 30 seconds (at 25° C.). So far as the Zahn cup (No. 3) viscosity falls within the foregoing range, the ink is not sufficiently coated on a material to be coated, thereby causing staining of a roll or the like. Also, when the Zahn cup (No. 3) viscosity exceeds 30 seconds, the ink does not sufficiently move into a roll, and it become difficult to form a uniform ink layer. For example, in a gravure printing machine, it is preferable that the Zahn cup (No. 3) viscosity is from 10 to 20 seconds (at 25° C.) during the use.

<Heat Sealable Resin Layer>

A heat sealable resin layer may be provided in the foregoing gas barrier laminate. For the heat sealable resin layer, for example, the film materials used for the flexible polymer layer of the foregoing gas barrier molded container are preferably exemplified. Of these, taking into consideration revealment of a good heat sealing property, a polyethylene film, a polypropylene film, an ethylene-vinyl acetate copolymer, an ionomer resin, an EAA resin, an EMAA resin, an EMA resin, an EMMA resin, a biodegradable resin and the like are preferable. A thickness of such a film is from about 10 to 300 μm, and preferably, a thickness of from about 10 to 100 μm is practical; and the surface of the film may be subjected to a surface treatment of every kind such as a flame treatment, a corona discharge treatment, etc.

Also, at least one layer of paper or a plastic film may be laminated between the gas barrier laminate and the heat sealable resin layer. As the plastic film, the film material composed of a plastic for constituting the foregoing substrate is exemplified.

<Printed Layer-Provided Gas Barrier Laminate>

The foregoing printed layer-provided gas barrier laminate is a laminate in which a substrate, an epoxy resin cured material layer and a printed layer are laminated, but it should not be construed that the present invention is limited thereto. As described previously, an inorganic vapor deposited layer, a heat sealable resin layer and the like may be provided.

In laminating each of the layers constituting the foregoing printed layer-provided gas barrier laminate, in the lamination of at least one place, an epoxy resin cured material layer obtained by coating the foregoing adhesive for laminate and curing it may be provided. In other places than the epoxy resin cured material layer using the subject adhesive, other adhesives, for example, polyester based, isocyanate based (urethane based), polyethylene-imine based, polybutadiene based or organic titanium based anchor coating agents, etc.; polyurethane based, polyacrylic, polyester based, epoxy based, polyvinyl acetate based, cellulose based or other adhesives for laminate; or the like may be used. Alternatively, film materials may be welded with each other. The gas barrier laminate is obtained in the same manner as in the foregoing production method of laminated film-1.

In the thus obtained printed layer-provided gas barrier laminate, it is preferable that the epoxy resin cured layer has an oxygen barrier property such that its coefficient of oxygen permeability is not more than 1.0 mL·mm/m$^2$·day·MPa (at 23° C. and 60% RH).

<Production of Packaging Container>

The foregoing gas barrier laminate can be used as a packaging container through bag-making or box-making. In the case of forming a soft packaging bag made of a polymer film and the like as the packaging container, a bag body can be configured by using the foregoing heat sealable resin layer-provided gas barrier laminate, superimposing the surfaces of the heat sealable resin layers thereof opposing to each other and heat sealing an outer peripheral edge thereof to form a sealed part. For example, as a bag-making method thereof, there is exemplified a method in which the foregoing multi-layered packaging material is folded, or the multilayered packaging materials are superimposed, the surfaces of the inner layers are made opposing to each other, and a peripheral edge is heat sealed. Examples of the heat sealing form which can be adopted herein include a side seal type, a two-sided seal type, a three-sided seal type, a four-sided seal type, an envelope making seal type, a butt seaming type (pillow seal type), a ribbed seal type, a flat bottom seal type, a square bottom seal type, a gazette type and the like. The packaging bag can take various forms depending upon the contents, use environment or use form, and examples of the form include a self-supporting packaging bag (standing pouch), a tubular container and the like.

Examples of the method for heat sealing include known methods such as bar sealing, rotating roll sealing, belt sealing, impulse sealing, high-frequency sealing, ultrasonic sealing and the like. In the foregoing packaging container, for example, a spout of one-piece type, two-piece type or other type, or an opening and closing zipper or the like can be arbitrarily installed.

Also, in the case of producing a paper substrate-including paper container for filling a liquid as the packaging container, a paper container for liquid of, for example, a brick type, a flat type or a gable top type or the like can be produced by, for example, producing a laminate having the foregoing gas barrier laminate laminated on a paper substrate, producing a blank plate for producing a desired paper container from the subject laminate and then performing box-making for a body, a bottom, a top, etc. using this blank plate. Also, the shape of the container may be any shape of a square-shaped container or a cylindrical paper can of a round shape or the like.

The thus obtained packaging container using a gas barrier laminate is excellent in a gas barrier property against an oxygen gas, etc., impact resistance and the like and excellent in post-processability such as laminate processing, printing processing, bag-making or box-making processing, etc. Also, the foregoing packaging container prevents, as a barrier film, separation of inorganic materials and prevents the generation of thermal cracks thereof or deterioration thereof and displays, as a barrier film, excellent resistance such as resistance to boiling treatment, resistance to retort, etc. In addition to the foregoing performances, the foregoing packaging container displays excellent packaging adaptability, storage adaptability, etc. of various products including chemicals or cosmetics or the like, for example, foods, pharmaceutical products, detergents, shampoos, oils, dentifrices, adhesives, pressure sensitive adhesives, etc., while making the best use of a characteristic feature that a non-halogen based material is useful.

EXAMPLES

The present invention is hereunder described in more detail with reference to the following Examples and Comparative Examples, but it should be construed that the present invention is not limited at all by these Examples.

Preparation Example 1-1

Preparation of Amine Based Epoxy Resin Curing Agent A1

A reactor was charged with one mole of m-xylylenediamine. The temperature was raised to 60° C. under a nitrogen gas stream, and 0.88 moles of methyl acrylate was added dropwise over one hour. The temperature was raised to 165° C. while distilling off formed methanol, and the resulting mixture was kept at 165° C. for 2.5 hours. Methanol in an amount corresponding to 65% of the solid concentration was added dropwise over 1.5 hours. After cooling to 65° C., 0.27 moles of molten ethylene carbonate was added dropwise over 30 minutes, and the resulting mixture was kept at 65° C. for 5 hours to obtain an amine based epoxy resin curing agent A1.

Preparation Example 1-2

Preparation of Amine Based Epoxy Resin Curing Agent B1

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol in an amount corresponding to 65% of the solid concentration was added dropwise over 1.5 hours. After cooling to 65° C., 0.11 moles of molten ethylene carbonate was added dropwise over 30 minutes, and the resulting mixture was kept at 65° C. for 5 hours to obtain an amine based epoxy resin curing agent B1.

Preparation Example 1-3

Preparation of Amine Based Epoxy Resin Curing Agent C1

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol in an amount corresponding to 65% of the solid concentration was added dropwise over 1.5 hours. After cooling to 65° C., 0.27 moles of molten ethylene carbonate was added dropwise over 30 minutes, and the resulting mixture was kept at 65° C. for 5 hours to obtain an amine based epoxy resin curing agent C1.

Preparation Example 1-4

Preparation of Amine Based Epoxy Resin Curing Agent D1

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol in an amount corresponding to 65% of the solid concentration was added dropwise over 1.5 hours. After cooling to 65° C., 0.55 moles of molten ethylene carbonate was added dropwise over 30 minutes, and the resulting mixture was kept at 65° C. for 5 hours to obtain an amine based epoxy resin curing agent D1.

Preparation Example 1-5

Preparation of Amine Based Epoxy Resin Curing Agent E1

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol in an amount corresponding to 65% of the solid concentration was added dropwise over 1.5 hours, and the mixture was stirred and then cooled to obtain an amine based epoxy resin curing agent E1.

Performances of Examples 1-1 to 1-7 and Comparative Examples 1-1 to 1-3 were evaluated as follows.

<Pot Life (hr:min)>

A solution (coating material solution) having an epoxy resin, an amine based epoxy resin curing agent and a solvent mixed therein was kept at 25° C. A viscosity was measured every 30 minutes by a Zahn cup No. 3, and the relationship between a retention time and a Zahn cup viscosity (second) was examined. A time from the preparation of the coating material solution until the Zahn cup viscosity reached 20 seconds was defined as a pot life.

<Coefficient of Oxygen Permeability (mL·mm/m$^2$·day·Mpa)>

An oxygen permeability of each of a coated film obtained by coating the coating material solution (epoxy resin composition) on a substrate and curing it and the substrate itself was measured under a condition at 23° C. and a relative humidity of 60% by using an oxygen permeability measuring device (OX-TRAN 2/21, manufactured by Modern Control, Inc.), and a coefficient of oxygen permeability of the coating film was calculated according to the following expression.

$$1/R_1 = 1/R_2 + DFT/P$$

Here, $R_1$: Oxygen permeability of coated film (mL/m$^2$·day·MPa)
$R_2$: Oxygen permeability of substrate (mL/m$^2$·day·MPa)
DFT: Thickness of coating film (mm)
P: Coefficient of oxygen permeability of coating film The conditions of the coating material solution and the substrate are shown below.

Substrate: Polyethylene terephthalate film (100 μm) (LUMIRROR, manufactured by Toray Industries, Inc.)
Coating: A bar coater No. 24 was used.
Solid concentration of coating material solution: 40%

<Chemical Resistance>

A non-coated portion of a coated plate obtained by coating the coating material on the substrate and curing it was covered by a paraffin, and the coated plate was then dipped in distilled water, methanol or toluene at 23° C. or sprayed with salt water; its change after elapsing one week was observed; and the appearance of the coating film before and after dipping in the chemical solution was evaluated by visual determination according to the following four grades.

Ex: The appearance did not change at all.
G: The initial appearance was substantially kept.
F: The appearance slightly changed.
P: The appearance changed.

The conditions of the coating material solution and the substrate are shown below.

Substrate: Cold rolled steel sheet (JIS G3141, 70×150×0.6 mm), which was subjected to a sanding (#240) treatment and used upon being washed with xylene.
Coating: A 200-μm doctor blade was used.
Solid concentration of coating material solution: 75%.

Example 1-1

A solution containing 222 parts by mass of the amine based epoxy resin curing agent A1, 50 parts by mass of a glycidylamino group-containing epoxy resin derived from m-xylylenediamine (TETRAD-X, manufactured by Mitsubishi Gas Chemical Company, Inc.), 247 parts by mass of methanol and 36 parts by mass of ethyl acetate was prepared, to which was then added 0.1 parts by mass of a silicon based antifoaming agent (BYK065, manufactured by BYK-Chemie GmbH), and the mixture was well stirred to obtain a coating material solution. This coating material solution was evaluated with respect to the pot life.

This coating material solution was coated on the substrate and subjected to a curing reaction at 40° C. for 2 days to prepare a coating film. The obtained coating film was evaluated with respect to the coefficient of oxygen permeability and the chemical resistance. The results are shown in Table 1.

Example 1-2

A coating film was prepared in the same manner as in Example 1-1, except for using 189 parts by mass of the amine based epoxy resin curing agent B1 in place of the amine based epoxy resin curing agent A1 and changing the amounts of methanol and ethyl acetate to 223 parts by mass and 32 parts by mass, respectively. The results are shown in Table 1.

Example 1-3

A coating film was prepared in the same manner as in Example 1-1, except for using 162 parts by mass of the amine based epoxy resin curing agent C1 in place of the amine based epoxy resin curing agent A1 and changing the amounts of methanol and ethyl acetate to 203 parts by mass and 29 parts by mass, respectively. The results are shown in Table 1.

Example 1-4

A coating film was prepared in the same manner as in Example 1-3, except for changing the amounts of the amine based epoxy resin curing agent C1, methanol and ethyl acetate to 244 parts by mass, 263 parts by mass and 39 parts by mass, respectively. The results are shown in Table 1.

Example 1-5

A coating film was prepared in the same manner as in Example 1-3, except for changing the amounts of the amine based epoxy resin curing agent C1, methanol and ethyl acetate to 325 parts by mass, 322 parts by mass and 49 parts by mass, respectively. The results are shown in Table 1.

Example 1-6

A coating film was prepared in the same manner as in Example 1-3, except for changing the amounts of the amine based epoxy resin curing agent C1, methanol, ethyl acetate and the silicon based antifoaming agent (BYK065, manufactured by BYK-Chemie GmbH) to 406 parts by mass, 383 parts by mass, 58 parts by mass and 0.2 parts by mass, respectively. The results are shown in Table 1.

Example 1-7

A coating film was prepared in the same manner as in Example 1-1, except for using 407 parts by mass of the amine based epoxy resin curing agent D1 in place of the amine based epoxy resin curing agent A1 and changing the amounts of methanol, ethyl acetate and the silicon based antifoaming agent (BYK065, manufactured by BYK-Chemie GmbH) to 384 parts by mass, 58 parts by mass and 0.2 parts by mass, respectively. The results are shown in Table 1.

Comparative Example 1-1

A coating film was prepared in the same manner as in Example 1-1, except for using 160 parts by mass of the amine based epoxy resin curing agent E1 in place of the amine based epoxy resin curing agent A1 and changing the amounts of methanol and ethyl acetate to 201 parts by mass and 29 parts by mass, respectively. The results are shown in Table 1.

Comparative Example 1-2

A coating film was prepared in the same manner as in Example 1-1, except for using 65 parts by mass of an amine based curing agent (GASKAMINE 328, manufactured by Mitsubishi Gas Chemical Company, Inc.) which is an adduct of m-xylylenediamine and epichlorohydrin in a molar ratio of m-xylylenediamine to epichlorohydrin of about 2/1 in place of the amine based epoxy resin curing agent. A1. The results are shown in Table 1.

Comparative Example 1-3

A coating film was prepared in the same manner as in Example 1-1, except for using 30 parts by mass of a general-purpose polyamide-modified polyamine modified with dimer acid (TOHMIDE 225-X, manufactured by Fuji Kasei Kogyo Co., Ltd.) as the amine based curing agent and 50 parts by mass of a glycidyloxy group-containing epoxy resin derived from bisphenol A (EPIKOTE 828, manufactured by Japan Epoxy Resins Co., Ltd.) as the epoxy resin and using MFG (propylene glycol monomethyl ether) as the dilution solvent. The results are shown in Table 1.

ethylene carbonate was added dropwise over 30 minutes, and the resulting mixture was kept at 65° C. for 5 hours to obtain an amine based epoxy resin curing agent A2.

Preparation Example 2-2

Amine Based Epoxy Resin Curing Agent B2

A reactor was charged with one mole of m-xylylenediamine. The temperature was raised to 60° C. under a nitrogen gas stream, and 0.90 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent B2.

Preparation Example 2-3

Amine Based Epoxy Resin Curing Agent C2

A reactor was charged with one mole of m-xylylenediamine. The temperature was raised to 60° C. under a nitrogen gas stream, and 0.88 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and

TABLE 1

| | Pot life (hr:min) | Coefficient of oxygen permeability (mL · mm/ m² · day · MPa) | Chemical resistance | | | |
|---|---|---|---|---|---|---|
| | | | Distilled water | Sprayed salt water | Methanol | Toluene |
| Example 1-1 | 9:30 | 0.33 | Ex | Ex | Ex | Ex |
| Example 1-2 | 4:00 | 0.34 | Ex | Ex | Ex | Ex |
| Example 1-3 | 4:30 | 0.33 | Ex | Ex | Ex | Ex |
| Example 1-4 | 6:00 | 0.61 | Ex | P | P | Ex |
| Example 1-5 | 5:00 | 0.24 | P | P | P | Ex |
| Example 1-6 | 5:30 | 0.68 | Ex | Ex | Ex | Ex |
| Example 1-7 | 9:00 | 0.43 | Ex | Ex | Ex | Ex |
| Comparative Example 1-1 | 2:45 | 0.33 | Ex | Ex | Ex | Ex |
| Comparative Example 1-2 | 3:00 | 0.16 | P | P | P | P |
| Comparative Example 1-3 | 2:30 | 30.7 | Ex | Ex | Ex | Ex |

Preparation Example 2-1

Amine Based Epoxy Resin Curing Agent A2

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten the resulting mixture was kept at 65° C. for 5 hours to obtain an amine based epoxy resin curing agent C2.

Preparation Example 2-4

Amine Based Epoxy Resin Curing Agent D2

A reactor was charged with one mole of m-xylylenediamine. The temperature was raised to 60° C. under a nitrogen gas stream, and 0.87 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent D2.

Preparation Example 2-5

Amine Based Epoxy Resin Curing Agent E2

A reactor was charged with one mole of m-xylylenediamine. The temperature was raised to 60° C. under a nitrogen gas stream, and 0.75 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent E2.

Preparation Example 2-6

Amine Based Epoxy Resin Curing Agent F2

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.55 moles of molten ethylene carbonate was added dropwise over 30 minutes, and the resulting mixture was kept at 65° C. for 5 hours to obtain an amine based epoxy resin curing agent F2.

Preparation Example 2-7

Amine Based Epoxy Resin Curing Agent G2

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.11 moles of molten ethylene carbonate was added dropwise over 30 minutes, and the resulting mixture was kept at 65° C. for 5 hours to obtain an amine based epoxy resin curing agent G2.

Preparation Example 2-8

Amine Based Epoxy Resin Curing Agent H2

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After stirring and cooling, an amine based epoxy resin curing agent H2 was obtained.

Performances of Examples 2-1 to 2-9 and Comparative Examples 2-1 to 2-2 were evaluated as follows.

<Pot Life (hr:min)>

A solution (adhesive) having an epoxy resin, an amine based epoxy resin curing agent and a solvent mixed therein was kept at 25° C. A viscosity was measured every 30 minutes by a Zahn cup No. 3, and the relationship between a retention time and a Zahn cup viscosity (second) was examined. A time from the preparation of the adhesive until the Zahn cup viscosity reached 20 seconds was defined as a pot life.

<Oxygen Permeability ($mL/m^2 \cdot day \cdot MPa$)>

An oxygen permeability of the laminated film was measured under a condition at 23° C. and a relative humidity of 60% by using an oxygen permeability measuring device (OX-IRAN ML2/21, manufactured by Modern Control, Inc.). Also, an oxygen permeability under a high humidity was measured under a condition at 23° C. and a relative humidity of 90%.

<Laminating Strength (g/15 mm)>

A laminating strength of the laminated film was measured at a peeling rate of 100 mm/min by a T-type peeling test according to the method designated in JIS K-6854.

<Laminating Strength (g/15 mm) after Boiling Treatment>

A laminating strength of the laminated film which had been subjected to a boiling treatment at 90° C. for 30 minutes using a retort food autoclave (manufactured by Tomy Co., Ltd.) was measured at a peeling rate of 100 mm/min by a T-type peeling test according to the method designated in JIS K-6854.

<Heat Seal Strength (kg/15 mm)>

A specimen of the laminated film which had been subjected to a heat seal treatment under a treatment condition at 150° C. and 2 $kg/cm^2$ for one second using a heat seal tester (heat gradient tester, manufactured by Toyo Seiki Seisaku-Sho, Ltd.) was evaluated at a strain rate of 300 mm/min.

Example 2-1

A solution containing 245 parts by mass of the amine based epoxy resin curing agent A2, 50 parts by mass of a glycidylamino group-containing epoxy resin derived from m-xylylenediamine TETRAD-X, manufactured by Mitsubishi Gas Chemical Company, Inc.), 265 parts by mass of methanol and 39 parts by mass of ethyl acetate was prepared, to which was then added 0.1 parts by mass of a silicon based antifoaming agent (BYK065, manufactured by BYK-Chemie GmbH), and the mixture was well stirred to obtain a coating solution. This coating solution was evaluated with respect to the pot life.

This coating solution was coated as an adhesive (coating amount: 3.8 $g/m^2$ (solid content)) on a 15 μm-thick stretched nylon film (HARDEN N1102, manufactured by Toyobo Co., Ltd.) by using a gravure roll with 110 lines/inch and having a depth of 95 μm and an impression cylinder having a hardness of A70 (JIS K6253) under an impression cylinder pressure of 2 $kg/cm^2$; subsequently, drying was carried out in a drying oven having a temperature of from 60° C. (in the vicinity of an inlet) to 90° C. (in the vicinity of an outlet); a 40 μm-thick linear low density polyethylene film (TUX-MCS, manufactured by Tohcello Co., Ltd.) was then stuck by a nip roll heated at 70° C.; and the resulting laminate was wound up at a winding rate of 120 m/min and then aged at 40° C. for 2 days to obtain a laminated film. The obtained laminated film was evaluated with respect to its gas barrier property and laminating strength. The results are shown in Table 2.

Example 2-2

A laminated film was prepared in the same manner as in Example 2-1, except for using 164 parts by mass of the amine based epoxy resin curing agent A2 and changing the amounts of methanol and ethyl acetate to 204 parts by mass and 29 parts by mass, respectively. The results are shown in Table 2.

Example 2-3

A laminated film was prepared in the same manner as in Example 2-1, except for using 327 parts by mass of the amine based epoxy resin curing agent A2 and changing the amounts of methanol and ethyl acetate to 324 parts by mass and 32 parts by mass, respectively. The results are shown in Table 2.

Example 2-4

A laminated film was prepared in the same manner as in Example 2-1, except for using 235 parts by mass of the amine based epoxy resin curing agent B2 in place of the amine based epoxy resin curing agent A2 and changing the amounts of methanol and ethyl acetate to 257 parts by mass and 38 parts by mass, respectively. The results are shown in Table 2.

Example 2-5

A laminated film was prepared in the same manner as in Example 2-1, except for using 228 parts by mass of the amine based epoxy resin curing agent C2 in place of the amine based epoxy resin curing agent A2 and changing the amounts of methanol and ethyl acetate to 252 parts by mass and 37 parts by mass, respectively. The results are shown in Table 2.

Example 2-6

A laminated film was prepared in the same manner as in Example 2-1, except for using 225 parts by mass of the amine based epoxy resin curing agent D2 in place of the amine based epoxy resin curing agent A2 and changing the amounts of methanol and ethyl acetate to 249 parts by mass and 36 parts by mass, respectively. The results are shown in Table 2.

Example 2-7

A laminated film was prepared in the same manner as in Example 2-1, except for using 191 parts by mass of the amine based epoxy resin curing agent E2 in place of the amine based epoxy resin curing agent A2 and changing the amounts of methanol and ethyl acetate to 224 parts by mass and 32 parts by mass, respectively. The results are shown in Table 2.

Example 2-8

A laminated film was prepared in the same manner as in Example 2-1, except for using 421 parts by mass of the amine based epoxy resin curing agent F2 in place of the amine based epoxy resin curing agent A2 and changing the amounts of methanol and ethyl acetate to 394 parts by mass and 60 parts by mass, respectively. The results are shown in Table 2.

Example 2-9

A laminated film was prepared in the same manner as in Example 2-1, except for using 191 parts by mass of the amine based epoxy resin curing agent G2 in place of the amine based epoxy resin curing agent A2 and changing the amounts of methanol and ethyl acetate to 224 parts by mass and 32 parts by mass, respectively. The results are shown in Table 2.

Comparative Example 2-1

A laminated film was prepared in the same manner as in Example 2-1, except for using 163 parts by mass of the amine based epoxy resin curing agent H2 in place of the amine based epoxy resin curing agent A2 and changing the amounts of methanol and ethyl acetate to 201 parts by mass and 29 parts by mass, respectively. The results are shown in Table 2.

Comparative Example 2-2

A laminated film was prepared in the same manner as in Example 2-1, except for preparing, as a polyurethane based adhesive coating solution, an ethyl acetate solution (solid concentration: 30% by mass) containing 50 parts by mass of a polyether component (TM-329, manufactured by Toyo-Morton, Ltd.) and 50 parts by mass of a polyisocyanate component (CAT-8B, manufactured by Toyo-Morton, Ltd.) and using it in place of the amine based epoxy resin curing agent A2. The results are shown in Table 2.

TABLE 2

|  | Pot life (hr) | Coefficient of oxygen permeability of coated layer (at 60% RH) (mL · mm/m$^2$ · day · MPa) | Oxygen permeability (at 60% RH) (mL/m$^2$ · day · MPa) | Laminating strength (g/15 mm) |
|---|---|---|---|---|
| Example 2-1 | 5.5 | 0.26 | 59 | 900 |
| Example 2-2 | 5.0 | 0.82 | 151 | 800 |
| Example 2-3 | 5.5 | 0.36 | 79 | 800 |
| Example 2-4 | 8.5 | 0.34 | 76 | 900 |
| Example 2-5 | 8.5 | 0.34 | 76 | 700 |
| Example 2-6 | 8.5 | 0.34 | 76 | 700 |
| Example 2-7 | 11.0 | 0.41 | 89 | 850 |
| Example 2-8 | 9.5 | 0.51 | 106 | 800 |
| Example 2-9 | 4.0 | 0.38 | 84 | 800 |
| Comparative Example 2-1 | 2.5 | 0.37 | 81 | 800 |
| Comparative Example 2-2 | 15.0 | >10 | >2500 | 800 |

Each of the laminated films prepared in Examples 2-1 and 2-5 and Comparative Example 2-1 was evaluated with respect to the heat seal strength, the oxygen permeability under a high humidity (relative humidity: 90%) and the laminating strength after boiling treatment. The results are shown in Table 3.

leakage was confirmed every passage of time by means of an organoleptic test. The case where the aroma retention property of the contents was kept was designated as "A"; the case where the odor leakage was slightly confirmed was designated as "B"; and the case where the odor leakage was explicitly confirmed was designated as "C".

TABLE 3

| | Pot life (hr) | Coefficient of oxygen permeability of coated layer (at 60% RH) (mL · mm/ $m^2$ · day · MPa) | Oxygen permeability (at 60% RH) (mL/ $m^2$ · day · MPa) | Oxygen permeability (at 90% RH) (mL/ $m^2$ · day · MPa) | Laminating strength (g/15 mm) | Laminating strength (after boiling treatment) (g/15 mm) | Heat seal strength (kg/15 mm) |
|---|---|---|---|---|---|---|---|
| Example 2-1 | 5.5 | 0.26 | 59 | 163 | 900 | 900 | 5.0 |
| Example 2-5 | 8.5 | 0.34 | 76 | 151 | 700 | 800 | 5.0 |
| Comparative Example 2-1 | 2.5 | 0.37 | 81 | 163 | 800 | 800 | 5.0 |

Preparation Example 3-1

Amine Based Epoxy Resin Curing Agent A3

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent A3.

Performances of Examples 3-1 to 3-2 and Comparative Examples 3-1 to 3-4 were evaluated as follows.

<Oxygen Barrier Property>

After sealing 100 mL of a nitrogen gas (oxygen concentration: not more than 0.03%) within a four-sided seal bag with a film area of 200 $cm^2$, the bag was stored at a temperature of 23° C. and a relative humidity of 60% for 7 days. A degree of oxygen permeability (mL/bag·7 days·MPa) was determined by measuring an oxygen concentration within the bag by GC (GC-14B, manufactured by Shimadzu Corporation), from which was then calculated an oxygen permeability (mL/ $m^2$·day·MPa).

<Laminating Strength (g/15 mm)>

After sealing 100 mL of a food, a chemical or the like in a four-sided seal bag with a film area of 200 $cm^2$, the bag was stored at a temperature of 23° C. and a relative humidity of 60% for 14 days. A laminating strength of the laminated film was measured before storing the contents (initial) and after storing for 14 days, respectively. The measurement was carried out at a peeling rate of 300 mm/min by a T-type peeling test according to the method designated in JIS K-6854.

<Aroma Retention Property>

A food, a chemical or the like was sealed in an amount of 20 mL in the case of a liquid and 20 g in the case of a solid, respectively in a four-sided seal bag with a film area of 200 $cm^2$, and this sealing bag was sealed in a glass contained and stored at a temperature of 23° C. and a relative humidity of 60% for from 1 to 14 days. The presence or absence of odor Production Example 3-1

Production of Laminated Film A3

A solution containing 245 parts by mass of the amine based epoxy resin curing agent A3 obtained in Preparation Example 3-1, 50 parts by mass of a glycidylamino group-containing epoxy resin derived from m-xylylenediamine (TETRAD-X, manufactured by Mitsubishi Gas Chemical Company, Inc.), 265 parts by mass of methanol and 39 parts by mass of ethyl acetate was prepared, to which was then added 0.1 parts by mass of a silicon based antifoaming agent (BYK065, manufactured by BYK-Chemie GmbH), and the mixture was well stirred to obtain a coating solution.

This coating solution was coated (coating amount: 3.8 g/$m^2$ (solid content)) on a 15 µm-thick stretched nylon film (HARDEN N1102, manufactured by Toyobo Co., Ltd.) by using a gravure roll with 110 lines/inch and having a depth of 95 µm and an impression cylinder having a hardness of A70 (JIS K6253) under an impression cylinder pressure of 2 kg/$cm^2$; subsequently, drying was carried out in a drying oven having a temperature of from 60° C. (in the vicinity of an inlet) to 90° C. (in the vicinity of an outlet); a 40 µm-thick linear low density polyethylene film (TUX-MCS, manufactured by Tohcello Co., Ltd.) was then stuck by a nip roll heated at 70° C.; and the resulting laminate was wound up at a winding rate of 120 m/min and then aged at 40° C. for 2 days to obtain a laminated film (laminated film A3).

Production Example 3-2

Production of Laminated Film B3

A laminated film B3 was obtained in the same manner as in the laminated film A3, except for using a 20 µm-thick stretched polypropylene film (PYLEN P2161, manufactured by Toyobo Co., Ltd.) in place of the 15 µm-thick stretched nylon film.

Production Example 3-3

Production of Laminated Film C3

A laminated film (laminated film C3) was prepared in the same manner as in the laminated film A3, except for using, as the coating solution, a polyurethane based adhesive coating solution composed of an ethyl acetate solution (solid concentration: 30% by mass) containing 50 parts by mass of a polyether component (TM-329, manufactured by Toyo-Morton, Ltd.) and 50 parts by mass of a polyisocyanate component (CAT-8B, manufactured by Toyo-Morton, Ltd.).

Production Example 3-4

Production of Laminated Film D3

A laminated film D3 was obtained in the same manner as in the laminated film C3, except for using a 20 μm-thick polyvinyl alcohol-coated stretched polypropylene film (AOP-BH, manufactured by Tohcello Co., Ltd.) in place of the 15 μm-thick stretched nylon film.

Production Example 3-5

Production of Laminated Film E3

A laminated film E3 was obtained in the same manner as in the laminated film C3, except for using a 20 μm-thick polyvinylidene chloride-coated stretched polypropylene film (SENECY KOP#6000, manufactured by Daicel Chemical Industries, Ltd.) in place of the 15 μm-thick stretched nylon film.

Production Example 3-6

Production of Laminated Film F3

A laminated film F3 was obtained in the same manner as in the laminated film C3, except for using a 20 μm-thick polyvinylidene chloride-coated stretched polypropylene film (V-OP OL-D, manufactured by Tohcello Co., Ltd.) in place of the 15 μm-thick stretched nylon film.

Example 3-1

Two sheets of the laminated film A3 of 12 cm×12 cm were prepared; the surfaces of the linear low density polyethylene films were superimposed opposing to each other; and an outer peripheral edge thereof was subjected to three-sided heat sealing to form a sealed part, thereby preparing a packaging bag of a three-sided seal type having an opening in an upper part thereof. The prepared packaging bag of a three-sided seal type was filled with a nitrogen gas, a food or a chemical; the opening was heat sealed to form a four-sided seal bag (film area: 200 cm$^2$); and the oxygen barrier property and the laminating strength were then evaluated according to the foregoing methods. The results are shown in Table 4.

Example 3-2

Two sheets of the laminated film B3 of 12 cm×12 cm were prepared; the surfaces of the linear low density polyethylene films were superimposed opposing to each other; and an outer peripheral edge thereof was subjected to three-sided heat sealing to form a sealed part, thereby preparing a packaging bag of a three-sided seal type having an opening in an upper part thereof. The prepared packaging bag of a three-sided seal type was filled with a nitrogen gas, a food or a chemical; the opening was heat sealed; and the oxygen barrier property and the laminating strength were then evaluated according to the foregoing methods. The results are shown in Table 5.

Comparative Example 3-1

A packaging bag was prepared and evaluated in the same manner as in Example 3-1, except for using the laminated film C3 in the place of the laminated film A3. The results are shown in Table 4.

Comparative Example 3-2

A packaging bag was prepared and evaluated in the same manner as in Example 3-2, except for using the laminated film D3 in the place of the laminated film B3. The results are shown in Table 5.

Comparative Example 3-3

A packaging bag was prepared and evaluated in the same manner as in Example 3-2, except for using the laminated film E3 in the place of the laminated film B3. The results are shown in Table 5.

Comparative Example 3-4

A packaging bag was prepared and evaluated in the same manner as in Example 3-2, except for using the laminated film F3 in the place of the laminated film B3. The results are shown in Table 5.

TABLE 4

| | Degree of oxygen permeability (mL/bag · 7 days · MPa) | Oxygen permeability (mL/ m$^2$ · day · MPa) | Coefficient of oxygen permeability of coated layer (mL · mm/ m$^2$ · day · MPa) | Laminating strength (g/15 mm) | | |
|---|---|---|---|---|---|---|
| | | | | Contents | Initial | After 14 days |
| Example 3-1 | 11.1 | 79.0 | 0.36 | Limonene | 750 | 750 |
| | | | | Methyl salicylate | 750 | 750 |
| | | | | Benzyl acetate | 750 | 650 |
| Comparative Example 3-1 | 42.0 | 300.0 | >10 | Limonene | 750 | 680 |
| | | | | Methyl salicylate | 750 | 270 |
| | | | | Benzyl acetate | 750 | 50 |

TABLE 5

|  | Degree of oxygen permeability (mL/bag · 7 days · MPa) | Oxygen permeability (mL/m² · day · MPa) | Coefficient of oxygen permeability of coated layer (mL · mm/ m² · day · MPa) | Contents | Aroma retention property | | |
|---|---|---|---|---|---|---|---|
|  |  |  |  |  | After 3 days | After 7 days | After 14 days |
| Example 3-2 | 13.1 | 93.8 | 0.36 | Limonene | A | A | A |
|  |  |  |  | Methyl salicylate | A | A | A |
|  |  |  |  | p-Dichlorobenzene | A | A | A |
|  |  |  |  | l-Menthol | A | A | A |
|  |  |  |  | Soy sauce | A | A | A |
|  |  |  |  | Vinegar | A | A | A |
|  |  |  |  | Powdered coffee | A | A | A |
|  |  |  |  | Tealeaves | A | A | A |
| Comparative Example 3-2 | 9.4 | 66.9 | >10 | Limonene | A | A | C |
|  |  |  |  | Methyl salicylate | A | A | A |
|  |  |  |  | p-Dichlorobenzene | A | A | B |
|  |  |  |  | l-Menthol | A | A | A |
|  |  |  |  | Soy sauce | B | C | C |
|  |  |  |  | Vinegar | A | B | C |
|  |  |  |  | Powdered coffee | A | A | A |
|  |  |  |  | Tealeaves | A | A | A |
| Comparative Example 3-3 | 9.8 | 69.8 | >10 | Limonene | C | C | C |
|  |  |  |  | Methyl salicylate | C | C | C |
|  |  |  |  | p-Dichlorobenzene | A | A | A |
|  |  |  |  | l-Menthol | A | A | A |
|  |  |  |  | Soy sauce | A | A | A |
|  |  |  |  | Vinegar | A | A | A |
|  |  |  |  | Powdered coffee | A | A | A |
|  |  |  |  | Tealeaves | A | A | A |
| Comparative Example 3-4 | 9.8 | 70.0 | >10 | Limonene | C | C | C |
|  |  |  |  | Methyl salicylate | C | C | C |

Preparation Example 4-1

Amine Based Epoxy Resin Curing Agent A4

A reactor was charged with one mole of m-xylylenediamine. The temperature was raised to 60° C. under a nitrogen gas stream, and 0.88 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent A4.

Preparation Example 4-2

Amine Based Epoxy Resin Curing Agent B4

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent B4.

Performances of Examples 4-1 to 4-11 and Comparative Examples 4-1 to 4-2 were evaluated with respect to the pot life, the oxygen permeability, the laminating strength, the laminating strength after boiling treatment and the heat seal strength in the same manners as in Example 2-1. Also, an oxygen permeability after flexing treatment was evaluated as follows.

<Oxygen Permeability after Flexing Treatment (mL/ m²·day·MPa)>

An oxygen permeability of the laminated film after applying a 360 degree-twist 50 times by using a Gelbo flex tester (manufactured by Rigaku Kogyo Co., Ltd.) was measured under a condition at 23° C. and a relative humidity of 60%.

Example 4-1

A solution containing 245 parts by mass of the amine based epoxy resin curing agent A4, 50 parts by mass of a glycidylamino group-containing epoxy resin derived from m-xylylenediamine (TETRAD-X, manufactured by Mitsubishi Gas Chemical Company, Inc.), 265 parts by mass of methanol and 39 parts by mass of ethyl acetate was prepared, to which was then added 0.1 parts by mass of a silicon based antifoaming agent (BYK065, manufactured by BYK-Chemie GmbH) and a silane coupling agent (SILA-ACE 5330, manufactured by Chisso Corporation), and the mixture was well stirred to obtain a coating solution.

The adhesive was coated on the surface of the vapor deposited side of a film having silica vapor deposited on a 12 μm-thick polyethylene terephthalate film (TECHBARRIER L, manufactured by Mitsubishi Plastics, Inc.) by using a gravure roll with 100 lines/inch and having a depth of 100 μm; subsequently, drying was carried out in a drying oven having a temperature of from 60° C. (in the vicinity of an inlet) to 90° C. (in the vicinity of an outlet); a 40 μm-thick linear low density polyethylene film (T.U.X MC-S, manufactured by Tohcello Co., Ltd.) was then stuck by a nip roll heated at 70° C.; and the resulting laminate was wound up at a winding rate of 130 m/min and then aged at 40° C. for 4 days to obtain a laminated film composed of substrate/vapor deposited layer/adhesive layer/sealant layer. The results are shown in Tables 6 and 7.

Example 4-2

A laminated film composed of substrate/vapor deposited layer/coated layer/adhesive layer/sealant layer was prepared in the same manner as in Example 4-1, except for using a film having alumina vapor deposited on a 12 μm-thick polyethylene terephthalate film and having a coated layer provided on the vapor deposited surface thereof (GL-AEH, manufactured by Toppan Printing Co., Ltd.) in place of the film having silica vapor deposited on a 12 μm-thick polyethylene terephthalate film (TECHBARRIER L, manufactured by Mitsubishi Plastics, Inc.) and using Z-6050, manufactured by Dow Corning Toray Silicone Co., Ltd. in place of the silane coupling agent, SILA-ACE 5330, manufactured by Chisso Corporation. The results are shown in Tables 6 and 7.

Example 4-3

A laminated film composed of substrate/vapor deposited layer/coated layer/adhesive layer/sealant layer was prepared in the same manner as in Example 4-1, except for using a film having silica vapor deposited on a 12 μm-thick polyethylene terephthalate film and having a coated layer provided on the vapor deposited surface thereof (TECHBARRIER TXR, manufactured by Mitsubishi Plastics, Inc.) in place of the film having silica vapor deposited on a 12 μm-thick polyethylene terephthalate film (TECHBARRIER L, manufactured by Mitsubishi Plastics, Inc.) and not adding the silane coupling agent. The results are shown in Tables 6 and 7.

Example 4-4

A laminated film composed of substrate/vapor deposited layer/adhesive layer/sealant layer was prepared in the same manner as in Example 4-1, except for using a film having silica vapor deposited on a 15 μm-thick stretched 6-nylon film (TECHBARRIER NY, manufactured by Mitsubishi Plastics, Inc.) in place of the film having silica vapor deposited on a 12 μm-thick polyethylene terephthalate film (TECHBARRIER L, manufactured by Mitsubishi Plastics, Inc.). The results are shown in Tables 6 and 7.

Example 4-5

A laminated film composed of substrate/vapor deposited layer/coated layer/adhesive layer/sealant layer was prepared in the same manner as in Example 4-1, except for using a film having silica/alumina binary vapor deposited on a 15 μm-thick stretched 6-nylon film and having a coated layer provided on the vapor deposited surface thereof (ECOSYAR VN106, manufactured by Toyobo Co., Ltd.) in place of the film having silica vapor deposited on a 12 μm-thick polyethylene terephthalate film (TECHBARRIER L, manufactured by Mitsubishi Plastics, Inc.) and not adding the silane coupling agent. The results are shown in Tables 6 and 7.

Example 4-6

A laminated film composed of substrate/vapor deposited layer/coated layer/adhesive layer/sealant layer was prepared in the same manner as in Example 4-1, except for using a film having silica vapor deposited on a 12 μm-thick polyethylene terephthalate film and having a coated layer provided on the vapor deposited surface thereof (MOS-TBH, manufactured by Oike & Co., Ltd.) in place of the film having silica vapor deposited on a 12 μm-thick polyethylene terephthalate film (TECHBARRIER L, manufactured by Mitsubishi Plastics, Inc.) and not adding the silane coupling agent. The results are shown in Tables 6 and 7.

Example 4-7

A laminated film composed of substrate/vapor deposited layer/coated layer/adhesive layer/sealant layer was prepared in the same manner as in Example 4-1, except for using a film having silica/alumina binary vapor deposited on a 12 μm-thick polyethylene terephthalate film and having a coated layer provided on the vapor deposited surface thereof (ECOSYAR VE106, manufactured by Toyobo Co., Ltd.) in place of the film having silica vapor deposited on a 12 μm-thick polyethylene terephthalate film (TECHBARRIER L, manufactured by Mitsubishi Plastics, Inc.) and not adding the silane coupling agent. The results are shown in Tables 6 and 7.

Example 4-8

A laminated film composed of substrate/vapor deposited layer/coated layer/adhesive layer/sealant layer was prepared in the same manner as in Example 4-1, except for using a film having silica/alumina binary vapor deposited on a 12 μm-thick polyethylene terephthalate film and having a coated layer provided on the vapor deposited surface thereof (ECOSYAR VE306, manufactured by Toyobo Co., Ltd.) in place of the film having silica vapor deposited on a 12 μm-thick polyethylene terephthalate film (TECHBARRIER L, manufactured by Mitsubishi Plastics, Inc.) and not adding the silane coupling agent. The results are shown in Tables 6 and 7.

Example 4-9

A laminated film composed of substrate/vapor deposited layer/coated layer/adhesive layer/sealant layer was prepared in the same manner as in Example 4-1, except for using a film having silica/alumina binary vapor deposited on a 15 μm-thick stretched 6-nylon film and having a coated layer provided on the vapor deposited surface thereof (ECOSYAR VE406, manufactured by Toyobo Co., Ltd.) in place of the film having silica vapor deposited on a 12 μm-thick polyethylene terephthalate film (TECHBARRIER L, manufactured by Mitsubishi Plastics, Inc.) and not adding the silane coupling agent. The results are shown in Tables 6 and 7.

Example 4-10

A laminated film composed of substrate/vapor deposited layer/coated layer/adhesive layer/sealant layer was prepared in the same manner as in Example 4-1, except for using a film having alumina vapor deposited on a 12 μm-thick polyethylene terephthalate film and having a coated layer provided on the vapor deposited surface thereof (BARRIALOX 1011HG-CW, manufactured by Toray Advanced Film Co., Ltd.) in place of the film having silica vapor deposited on a 12 μm-thick polyethylene terephthalate film (TECHBARRIER L, manufactured by Mitsubishi Plastics, Inc.) and not adding the silane coupling agent. The results are shown in Tables 6 and 7.

Example 4-11

A laminated film composed of substrate/vapor deposited layer/coated layer/adhesive layer/sealant layer was prepared in the same manner as in Example 4-1, except for using a film having alumina vapor deposited on a 12 μm-thick polyethylene terephthalate film and having a coated layer provided on the vapor deposited surface thereof (BARRIALOX 1011HG-CR, manufactured by Toray Advanced Film Co., Ltd.) in place of the film having silica vapor deposited on a 12 μm- thick polyethylene terephthalate film (TECHBARRIER L, manufactured by Mitsubishi Plastics, Inc.) and not adding the silane coupling agent. The results are shown in Tables 6 and 7.

Comparative Example 4-1

A laminated film composed of substrate/vapor deposited layer/adhesive layer/sealant layer was prepared in the same manner as in Example 4-1, except for using 163 parts by mass of the amine based epoxy resin curing agent B4 in place of the amine based epoxy resin curing agent A4 and changing the amounts of methanol and ethyl acetate to 201 parts by mass and 29 parts by mass, respectively. The results are shown in Tables 6 and 7.

Comparative Example 4-2

A laminated film composed of substrate/vapor deposited layer/adhesive layer/sealant layer was prepared in the same manner as in Example 4-1, except for preparing, as a polyurethane based adhesive coating solution, an ethyl acetate solution (solid concentration: 30% by mass) containing 50 parts by mass of a polyether component (TM-329, manufactured by Toyo-Morton, Ltd.) and 50 parts by mass of a polyisocyanate component (CAT-8B, manufactured by Toyo-Morton, Ltd.) and using it in place of the coating solution of Example 4-1 and not using the silicon based antifoaming agent and the silane coupling agent. The results are shown in Tables 6 and 7.

The results obtained by evaluating each of the laminated films prepared in Examples 4-1 to 4-11 and Comparative Examples 4-1 to 4-2 with respect to the pot life, the laminating strength, the laminating strength after boiling treatment and the heat seal strength are shown in Table 6.

TABLE 6

|  | Pot life (hr) | Laminating strength (g/15 mm) | Laminating strength after boiling (g/15 mm) | Heat seal strength (kg/15 mm) |
|---|---|---|---|---|
| Example 4-1 | 8.5 | 720 | 750 | 4.5 |
| Example 4-2 | 8.5 | 480 | 450 | 3.7 |
| Example 4-3 | 8.5 | 770 | 710 | 4.5 |
| Example 4-4 | 8.5 | 710 | 660 | 4.3 |
| Example 4-5 | 8.5 | 700 | 780 | 4.4 |
| Example 4-6 | 8.5 | 710 | 750 | 4.5 |

TABLE 6-continued

|  | Pot life (hr) | Laminating strength (g/15 mm) | Laminating strength after boiling (g/15 mm) | Heat seal strength (kg/15 mm) |
|---|---|---|---|---|
| Example 4-7 | 8.5 | 810 | 760 | 4.3 |
| Example 4-8 | 8.5 | 770 | 800 | 4.4 |
| Example 4-9 | 8.5 | 720 | 760 | 4.8 |
| Example 4-10 | 8.5 | 720 | 760 | 4.4 |
| Example 4-11 | 8.5 | 720 | 760 | 4.3 |
| Comparative Example 4-1 | 2.5 | 850 | 800 | 4.4 |
| Comparative Example 4-2 | 15.0 | 870 | 810 | 4.6 |

Next, the results obtained by evaluating each of the laminated films prepared in Examples 4-1 to 4-11 and Comparative Examples 4-1 to 4-2 with respect to the oxygen permeability are shown in Table 7.

TABLE 7

|  | Coefficient of oxygen permeability of coated layer (at 60% RH) (mL·mm/m$^2$·day·MPa) | Oxygen permeability before Gelbo flex (at 60% RH) (mL/m$^2$·day·MPa) | Oxygen permeability after Gelbo flex by flexing 50 times (at 60% RH) (mL/m$^2$·day·MPa) |
|---|---|---|---|
| Example 4-1 | 0.33 | 2.47 | 7.11 |
| Example 4-2 | 0.33 | 2.17 | 7.40 |
| Example 4-3 | 0.33 | 1.88 | 7.30 |
| Example 4-4 | 0.33 | 2.07 | 7.60 |
| Example 4-5 | 0.33 | 2.37 | 8.29 |
| Example 4-6 | 0.33 | 2.47 | 8.39 |
| Example 4-7 | 0.33 | 2.37 | 7.30 |
| Example 4-8 | 0.33 | 1.88 | 7.01 |
| Example 4-9 | 0.33 | 2.07 | 7.70 |
| Example 4-10 | 0.33 | 1.97 | 8.29 |
| Example 4-11 | 0.33 | 2.07 | 8.59 |
| Comparative Example 4-1 | 0.33 | 2.47 | 7.30 |
| Comparative Example 4-2 | <10 | 2.47 | 89.3 |

Preparation Example 5-1

Amine Based Epoxy Resin Curing Agent A5

A reactor was charged with one mole of m-xylylenediamine. The temperature was raised to 60° C. under a nitrogen gas stream, and 0.88 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent A5.

Preparation Example 5-2

Amine Based Epoxy Resin Curing Agent B5

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent B5.

Performances of Examples 5-1 to 5-3 and Comparative Examples 5-1 to 5-3 were evaluated with respect to the pot life and the laminating strength in the same manners as in Example 2-1. Also, an appearance of a molded article and an oxygen permeability were evaluated as follows.

<Appearance of Molded Article>

The molded article was visually observed on whether or more winkles or elongation appeared.

<Oxygen Permeability (mL/m²·day·MPa)>

An oxygen permeability of the container was measured under a condition at 23° C. and a relative humidity of 60% by using an oxygen permeability measuring device (OX-TRAN 10/50A, manufactured by Modern Control, Inc.), thereby determining an oxygen permeability (mL/package·day·0.21 MPa) of the container. A thickness of the oxygen barrier layer before molding was measured, and a coefficient of oxygen permeability (mL·mm/m²·day·MPa) per unit thickness was calculated by using an average coating thickness calculated from a surface area ratio before and after molding.

Example 5-1

A solution containing 534 parts by mass of the amine based epoxy resin curing agent A5, 50 parts by mass of a glycidylamino group-containing epoxy resin derived from m-xylylenediamine (TETRAD-X, manufactured by Mitsubishi Gas Chemical Company, Inc.), 500 parts by mass of methanol and 77 parts by mass of ethyl acetate was prepared, to which was then added 0.1 parts by mass of a silicon based antifoaming agent (BYK065, manufactured by BYK-Chemie GmbH), and the mixture was well stirred to obtain an adhesive having an equivalent ratio of active hydrogen in the epoxy resin curing agent to an epoxy group in the epoxy resin ((active hydrogen)/(epoxy group)) of 3.0 and a Zahn cup (No. 3) viscosity of 14 seconds (at 25° C.).

The adhesive was coated on a 30 μm-thick non-stretched polypropylene film by using a gravure roll with 100 lines/cm and having a depth of 100 μm; drying was carried out in a drying oven having a temperature of from 60° C. (in the vicinity of an inlet) to 90° C. (in the vicinity of an outlet); a 400 μm-thick amorphous polyester sheet was then stuck by a nip roll heated at 50° C.; and the resulting laminate was wound up at a winding rate of 40 m/min and then aged at 40° C. for 2 days to obtain a laminated film.

Furthermore, a box-shaped container having a container depth (d) of 3.5 cm, whose opening had a rectangular shape with an opening major axis of 8.5 cm and an opening minor axis of 5 cm, having a diameter (l) of an upper opening of the container of 9.9 cm, with a d/l ratio being 0.35, and having a surface area of 100 cm² was obtained by means of vacuum molding. The obtained laminated sheet was evaluated with respect to the laminating strength, and the box-shaped container was evaluated with respect to its oxygen barrier property. The results are shown in Table 8.

Example 5-2

Lamination was carried out in the same manner as in Example 1, except for using a 450 μm-thick non-stretch polypropylene sheet in place of the 400 μm-thick amorphous polyester sheet and adding an aminosilane based coupling agent (Z-6050, manufactured by Dow Corning Tray Co., Ltd.) to the adhesive coating solution, followed by vacuum molding to obtain a jelly type container having a container depth (d) of 2.7 cm, whose opening had a circular shape of an opening diameter of 6.2 cm, having a diameter (l) of an upper opening of the container of 6.2 cm, with a d/l ratio being 0.44, and having a surface area of 70 cm². The obtained container was evaluated with respect to its oxygen barrier property. The results are shown in Table 8.

Example 5-3

A container was prepared in the same manner as in Example 5-2, except for changing the equivalent ratio of active hydrogen in the epoxy resin curing agent to an epoxy group in the epoxy resin ((active hydrogen)/(epoxy group)) to 5.0. The results are shown in Table 8.

Comparative Example 5-1

A container was prepared in the same manner as in Example 5-1, except for using 400 parts by mass of the amine based epoxy resin curing agent B5 in place of the amine based epoxy resin curing agent A5 and changing the amounts of methanol and ethyl acetate to 378 parts by mass and 58 parts by mass, respectively. The results are shown in Table 8.

Comparative Example 5-2

Lamination was carried out according to the same procedures as in Example 5-2, except for changing the equivalent ratio of active hydrogen in the epoxy resin curing agent to an epoxy group in the epoxy resin ((active hydrogen)/(epoxy group)) to 1.2, and the molded container was evaluated with respect to its oxygen barrier property. Crack-like streaks were visually observed in the surroundings of the bottom of the container. It is estimated that a defect was caused in the oxygen barrier layer because the oxygen permeability was extremely large. The results are shown in Table 8.

Comparative Example 5-3

A laminated film was prepared in the same manner as in Example 2, except for preparing, as a polyurethane based adhesive coating solution, an ethyl acetate solution (solid concentration: 30% by mass) containing 50 parts by mass of a polyether component (TM-329, manufactured by Toyo-Morton, Ltd.) and 50 parts by mass of a polyisocyanate component (CAT-8B, manufactured by Toyo-Morton, Ltd.) and using it in place of the coating solution of Example 5-2. The results are shown in Table 8.

TABLE 8

|  | Pot life (hr) | Laminating strength (g/15 mm) | Appearance of molded article | Oxygen permeability (at 23° C. and 60% RH) (mL/package · day · 0.21 MPa) | Coefficient of oxygen permeability of oxygen barrier layer (at 23° C. and 60% RH) (mL · mm/ m² · day · MPa) |
|---|---|---|---|---|---|
| Example 5-1 | 11.0 | 940 | Good | 0.30 | 0.97 |
| Example 5-2 | 11.0 | 950 | Slightly good | 0.98 | 1.09 |
| Example 5-3 | 14.0 | 1000 | Good | 0.96 | 1.06 |

TABLE 8-continued

| | Pot life (hr) | Laminating strength (g/15 mm) | Appearance of molded article | Oxygen permeability (at 23° C. and 60% RH) (mL/package · day · 0.21 MPa) | Coefficient of oxygen permeability of oxygen barrier layer (at 23° C. and 60% RH) (mL · mm/ $m^2$ · day · MPa) |
|---|---|---|---|---|---|
| Comparative Example 5-1 | 2.5 | 960 | Good | 0.28 | 0.80 |
| Comparative Example 5-2 | 8.5 | 950 | Poor | 4.94 | 18.75 |
| Comparative Example 5-3 | 15.0 | 1000 | Good | >10 | — |

Preparation Example 6-1

Amine Based Epoxy Resin Curing Agent A6

A reactor was charged with one mole of m-xylylenediamine. The temperature was raised to 60° C. under a nitrogen gas stream, and 0.88 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent A6.

Preparation Example 6-2

Amine Based Epoxy Resin Curing Agent B6

A reactor was charged with one mole of m-xylylenediamine. The temperature was raised to 60° C. under a nitrogen gas stream, and 0.93 moles of methyl acrylate was added dropwise over one hour. The temperature was raised to 165° C. while distilling off formed methanol, and the resulting mixture was kept at 165° C. for 2.5 hours. Methanol was added dropwise over 1.5 hours such that the solid concentration was 65%. After cooling to 65° C., 0.27 moles of molten ethylene carbonate was added dropwise over 30 minutes, and the resulting mixture was kept at 65° C. for 5 hours to obtain an amine based epoxy resin curing agent B6.

Preparation Example 6-3

Preparation of Urethane Based Adhesive

An ethyl acetate solution (solid concentration: 25% by mass) containing 50 parts by mass of a main agent composed of a polyurethane resin (TM-329, manufactured by Toyo-Morton, Ltd.) and 50 parts by mass of a curing agent composed of a polyisocyanate component (CAT-8B, manufactured by Toyo-Morton, Ltd.) was prepared and well stirred to obtain a urethane based adhesive coating solution.

Performances of Examples 6-1 to 6-10 and Comparative Examples 6-1 to 6-5 were evaluated with respect to the pot life and the oxygen permeability in the same manners as in Example 2-1. Also, flexing resistance was evaluated as follows.

<Flexing Resistance>

An oxygen permeability (mL/$m^2$·day·MPa) of the film after applying a 360° C.-twist 50 times by using a Gelbo flex tester (manufactured by Rigaku Kogyo Co., Ltd.) was measured under a condition at 23° C. and a relative humidity of 90%.

Example 6-1

50 parts by mass of a glycidylamino group-containing epoxy resin derived from m-xylylenediamine (TETRAD-X, manufactured by Mitsubishi Gas Chemical Company, Inc.), 245 parts by mass of the epoxy resin curing agent A6, 980 parts by mass of methanol, 118 parts by mass of ethyl acetate (solid concentration: 15% by mass), 0.1 parts by mass of a silicon based antifoaming agent (BYK065, manufactured by BYK-Chemie GmbH) and 2 parts by mass of a silane coupling agent (SILA-ACE S330, manufactured by Chisso Corporation) were added and well stirred to obtain a coating solution A6 (epoxy resin composition) having a Zahn cup (No. 3) viscosity of 11 seconds (at 25° C.).

A 12 μm-thick polyethylene terephthalate film having silica vapor deposited thereon (TECHBARRIER L, manufactured by Mitsubishi Plastics, Inc.) was used as a substrate; the coating solution A6 was coated on the vapor deposited layer by using a roll with a plate depth of 26 μm; drying was carried out in a drying oven at 70° C.; a gravure ink (NT-HILAMIC-701R WHITE (manufactured by Dainichiseika Color & Chemicals Mfg. Co., Ltd.) having 5% of NT-HILAMIC HARDENER (manufactured by Dainichiseika Color & Chemicals Mfg. Co., Ltd.) incorporated therein) was then adjusted so as to have a Zahn cup (No. 3) viscosity of 16 seconds (at 25° C.) by the addition of a mixed solvent of ethyl acetate/MEK/IPA (4/4/2), thereby preparing a coating solution A; the coating solution A was coated on the epoxy resin composition-coated surface by using a roll with a plate depth of 26 μm; drying was carried out in a drying oven at 70° C.; and the laminate was then wound up at a winding rate of 120 m/min to obtain a printed layer-provided gas barrier film (gas barrier laminate).

The urethane based adhesive was coated as an adhesive (coating amount: 2.5 g/$m^2$ (solid content)) on this gas barrier film by using a gravure roll with 140 lines/inch and having a depth of 75 μm; subsequently, drying was carried out in a drying oven having a temperature of from 60° C. (in the vicinity of an inlet) to 90° C. (in the vicinity of an outlet); a 40 μm-thick linear low density polyethylene film (TUX-MCS, manufactured by Tohcello Co., Ltd.) was then stuck by a nip roll heated at 70° C.; and the resulting laminate was wound up at a winding rate of 120 m/min and then aged at 40° C. for 2 days to obtain a laminated film.

The obtained laminated film was evaluated with respect to its gas barrier property and flexing resistance. The results are shown in Table 9. A content of the skeleton structure represented by the forgoing formula (7) in the epoxy resin cured material layer was 62.0% by mass. Also, a thickness of the epoxy resin cured material layer was 1.0 μm, and a coefficient of oxygen permeability calculated from the oxygen permeability was 0.03 mL·mm/m²·day·MPa (at 23° C. and 60% RH).

Example 6-2

A laminated film was prepared in the same manner as in Example 6-1, except for using a 12 μm-thick polyester film having alumina vapor deposited thereon (BARRIALOX 1011HG, manufactured by Toray Advanced Film Co., Ltd.) in place of the 12 μm-thick polyester film having silica vapor deposited thereon. The results are shown in Table 9.

Example 6-3

A laminated film was prepared in the same manner as in Example 6-1, except for using a 12 μm-thick polyester film having silica/alumina binary vapor deposited thereon (ECOSYAR VE100, manufactured by Toyobo Co., Ltd.) in place of the 12 μm-thick polyester film having silica vapor deposited thereon.

Example 6-4

A laminated film was prepared in the same manner as in Example 6-1, except for using a 15 μm-thick nylon film having silica vapor deposited thereon (TECHBARRIER NR, manufactured by Mitsubishi Plastics, Inc.) in place of the 12 μm-thick polyester film having silica vapor deposited thereon. The results are shown in Table 9.

Example 6-5

A laminated film was prepared in the same manner as in Example 6-1, except for using a 12 μm-thick polyester film having alumina vapor deposited thereon (GL-AEH, manufactured by Toppan Printing Co., Ltd.) in place of the 12 μm-thick polyester film having silica vapor deposited thereon and using Z-6050, manufactured by Dow Corning Toray Silicone Co., Ltd. in place of the silane coupling agent, SILA-ACE 5330, manufactured by Chisso Corporation. The results are shown in Table 9.

Example 6-6

An extrusion laminator system composed of an anchor coating device, a uniaxial extruder, a T-die, a cooling roll, a slitter and a winder was used, and the coating solution A6 was coated as an anchor coating agent (coating amount: 1.1 g/m² (solid content)) on the printed surface of the gas barrier film of Example 1 by using a gravure roll with 200 lines/inch and having a depth of 38 μm. Subsequently, after drying the subject film in a drying oven at 80° C., a low density polyethylene film (NOVATEC LC-600A, manufactured by Japan Polyethylene Corporation) was extrusion laminated in a thickness of 20 μm between the subject film and a 40 μm-thick linear low density polyethylene film (TUX-MCS, manufactured by Tohcello Co., Ltd.) to be drawn out as a sealant layer; and the laminate was wound up at a winding rate of 100 m/min and then aged at 40° C. for one day to obtain a laminated film. The results are shown in Table 9.

Example 6-7

A laminated film was prepared in the same manner as in Example 6-1, except for using a 15 μm-thick stretched nylon film (HARDEN FILM N1102, manufactured by Toyobo Co., Ltd.) in place of the 12 μm-thick polyester film having silica vapor deposited thereon. The results are shown in Table 9.

Example 6-8

A laminated film was prepared in the same manner as in Example 6-1, except for using a 12 μm-thick stretched polyester film (ESTER FILM E5100, manufactured by Toyobo Co., Ltd.) in place of the 12 μm-thick polyester film having silica vapor deposited thereon. The results are shown in Table 9.

Example 6-9

A laminated film was prepared in the same manner as in Example 6-1, except for using a 20 μm-thick stretched polypropylene film (PYLEN FILM P2161, manufactured by Toyobo Co., Ltd.) in place of the 12 μm-thick polyester film having silica vapor deposited thereon. The results are shown in Table 9.

Example 6-10

A laminated film was prepared in the same manner as in Example 6-1, except for changing the amounts of methanol and ethyl acetate to 478 parts by mass and 63 parts by mass (solid concentration: 25% by mass), respectively and using a roll with a plate depth of 13 μm in place of the roll with a plate depth of 26 μm. The results are shown in Table 9.

Comparative Example 6-1

A laminated film was prepared in the same manner as in Example 6-1, except not coating the coating solution A6 (epoxy resin composition). The results are shown in Table 9.

Comparative Example 6-2

A laminated film was prepared in the same manner as in Comparative Example 6-1, except for using a 12 μm-thick polyester film having alumina vapor deposited thereon (BARRIALOX 1011HG, manufactured by Toray Advanced Film Co., Ltd.) in place of the 12 μm-thick polyester film having silica vapor deposited thereon. The results are shown in Table 9.

Comparative Example 6-3

A laminated film was prepared in the same manner as in Comparative Example 6-1, except for using a 12 μm-thick stretched polyester film (ESTER FILM E5100, manufactured by Toyobo Co., Ltd.) in place of the 12 μm-thick polyester film having silica vapor deposited thereon. The results are shown in Table 9.

Comparative Example 6-4

A laminated film was prepared in the same manner as in Example 6-1, except for using 163 parts by mass of the epoxy resin curing agent B in place of the amine based epoxy resin curing agent A6 and using 365 parts by mass of methanol and 47 parts by mass of ethyl acetate. The results are shown in Table 9.

Comparative Example 6-5

A laminated film was prepared in the same manner as in Comparative Example 1, except for using a 20 μm-thick PVA-coated stretched polypropylene film (A-OP-BH, manufactured by Tohcello Co., Ltd.) in place of the 12 μm-thick polyester film having silica vapor deposited thereon. The results are shown in Table 9.

TABLE 9

| | Coefficient of oxygen permeability of coated layer (mL · mm/m² · day · MPa) | Gas barrier property (Oxygen permeability before Gelbo treatment) (mL/m² · day · MPa) | Flexing resistance (Oxygen permeability after Gelbo treatment) (mL/m² · day · MPa) | Pot life (hr) |
|---|---|---|---|---|
| Example 6-1 | 0.33 | 1.97 | 22.7 | 40.0 |
| Example 6-2 | 0.33 | 2.96 | 30.6 | 40.0 |
| Example 6-3 | 0.33 | 8.88 | 23.7 | 40.0 |
| Example 6-4 | 0.33 | 3.95 | 25.7 | 40.0 |
| Example 6-5 | 0.33 | 2.96 | 20.77 | 40.0 |
| Example 6-6 | 0.33 | 1.97 | 21.77 | 40.0 |
| Example 6-7 | 0.33 | 184 | 260.6 | 40.0 |
| Example 6-8 | 0.33 | 254 | 415 | 40.0 |
| Example 6-9 | 0.33 | 306 | 494 | 40.0 |
| Example 6-10 | 0.33 | 1.97 | 20.7 | 16.0 |
| Comparative Example 6-1 | >10 | 13.82 | 180 | — |
| Comparative Example 6-2 | >10 | 11.84 | 187 | — |
| Comparative Example 6-3 | >10 | 1313 | 1313 | — |
| Comparative Example 6-4 | >10 | 1.97 | 21.7 | 6.5 |
| Comparative Example 6-5 | >10 | 14.8 | >2000 | — |

INDUSTRIAL APPLICABILITY

According to the present invention, an amine based epoxy resin curing agent comprising an epoxy resin and an amine compound capable of imparting a high gas barrier performance and a long pot life, in addition to excellent performances which an epoxy resin conventionally possesses, and an epoxy resin composition with a high gas barrier performance and a long pot life, which comprises the subject curing agent, can be obtained. Also, according to the present invention, an adhesive for laminate with excellent adhesiveness to various polymers, papers, metals, etc., which comprises, as a main component, an epoxy resin composition containing an amine based resin curing agent with a high gas barrier performance and a long pot life, can be obtained.

The epoxy resin composition of the present invention is able to be similarly coated on a material to be coated, for which an adhesive for plastic films to be used for applications of packaging materials of foods, pharmaceutical products, etc., such as polyolefins, polyesters, polyamides, etc., or a conventional epoxy resin coating material is used, such as plastic containers, metals, concretes, etc. and to impart a gas barrier property thereto. Also, the adhesive for laminate of the present invention is suitably used for gas barrier packaging materials to be used for confectioneries, staples, processed agricultural products, processed livestock products, processed marine products, fleshes, vegetables, precooked foods, e.g., frozen ready prepared foods, chilled ready prepared foods, etc., dairy products, liquid seasonings, etc.; cosmetics; medical and pharmaceutical products; and the like.

What is claimed is:

1. An amine based epoxy resin curing agent comprising a reaction product of the following (A), (B) and (D) or a reaction product of the following (A), (B), (C) and (D):
    (A) m-xylylenediamine or p-xylylenediamine,
    (B) a polyfunctional compound having at least one acyl group, which is capable of forming an amide group site through a reaction with a polyamine and forming an oligomer,
    (C) a monovalent carboxylic acid having from 1 to 8 carbon atoms and/or its derivative, and
    (D) a cyclic compound having at least one carbonate site represented by the formula (2), which is capable of forming a carbamate site represented by the formula (1) through a reaction with a polyamine:

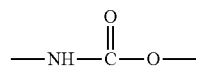

(1)

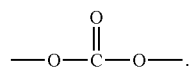

(2)

2. The amine based epoxy resin curing agent according to claim 1, wherein the compound (A) is m-xylylenediamine.

3. The amine based epoxy resin curing agent according to claim 1, wherein the polyfunctional compound (B) is acrylic acid, methacrylic acid and/or a derivative thereof.

4. The amine based epoxy resin curing agent according to claim 1, wherein the monovalent carboxylic acid having from 1 to 8 carbon atoms and/or its derivative (C) is formic acid, acetic acid, propionic acid, valeric acid, lactic acid, glycolic acid, benzoic acid and/or a derivative thereof.

5. The amine based epoxy resin curing agent according to claim 1, wherein the compound (D) is ethylene carbonate and/or propylene carbonate.

6. A gas barrier epoxy resin composition comprising an epoxy resin and the amine based epoxy resin curing agent according to claim 1.

7. The gas barrier epoxy resin composition according to claim 6, wherein a coefficient of oxygen permeability of a cured material obtained through curing is not more than 1.0 mL·mm/m²·day·MPa (at 23° C. and 60% RH).

8. The gas barrier epoxy resin composition according to claim 6, wherein a ratio of the total sum of a number of a carbon-carbon double bond of (B), a double number of an acyl group number of (B), a number of a carboxyl group and its derived functional group of (C) and a number of a carbonate site of (D) to a number of active hydrogen of (A) in carrying out the reaction of (A), (B) and (D) or the reaction of (A), (B), (C) and (D) is in the range of from 1.00 to 3.99.

9. The gas barrier epoxy resin composition according to claim 6, wherein the amine based epoxy resin curing agent is a reaction product among (a) m-xylylenediamine, (b) acrylic acid, methacrylic acid and/or a derivative thereof and (d) ethylene carbonate, propylene carbonate or trimethylene carbonate.

10. The gas barrier epoxy resin composition according to claim 9, wherein a reaction molar ratio of (a) to (b) to (d) ((a)/(b)/(d)) is in the range of 1/(from 0.7 to 0.95)/(from 0.1 to 0.7).

11. The gas barrier epoxy resin composition according to claim 6, wherein the epoxy resin is at least one resin selected among an epoxy resin having a glycidylamino group derived from m-xylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and/or a glycidyloxy group derived from p-aminophenol, an epoxy resin having a glycidyloxy group derived from bisphenol A, an epoxy resin having a glycidyloxy group derived from bisphenol F, an epoxy resin having a glycidyloxy group derived from phenol novolak and an epoxy resin having a glycidyloxy group derived from resorcinol.

12. The gas barrier epoxy resin composition according to claim 6, wherein the epoxy resin is an epoxy resin having a glycidylamino group derived from m-xylylenediamine.

13. The gas barrier epoxy resin composition according to claim 6, wherein a blending proportion of the epoxy resin and the amine based epoxy resin curing agent in the epoxy resin composition is in the range of from 0.5 to 5.0 in terms of an equivalent ratio of active hydrogen in the epoxy resin curing agent to an epoxy group in the epoxy resin ((active hydrogen)/(epoxy group)).

14. A coating material comprising the gas barrier epoxy resin composition according to claim 6.

15. An adhesive for laminate comprising, as a main component, the epoxy resin composition according to claim 6.

16. The adhesive for laminate according to claim 15, wherein a blending proportion of the epoxy resin and the amine based epoxy resin curing agent in the epoxy resin composition is in the range of from 0.2 to 5.0 in terms of an equivalent ratio of active hydrogen in the epoxy resin curing agent to an epoxy group in the epoxy resin ((active hydrogen)/(epoxy group)).

17. The adhesive for laminate according to claim 15, wherein the epoxy resin comprises, as a main component, an epoxy resin having a glycidylamino group derived from m-xylylenediamine and/or an epoxy resin having a glycidyloxy group derived from bisphenol F.

18. The adhesive for laminate according to claim 15, wherein the epoxy resin comprises, as a main component, an epoxy resin having a glycidylamino group derived from m-xylylenediamine.

* * * * *